(12) United States Patent
Kato et al.

(10) Patent No.: US 9,845,857 B2
(45) Date of Patent: Dec. 19, 2017

(54) COMBINE

(71) Applicant: Kubota Corporation, Osaka-shi (JP)

(72) Inventors: Yuji Kato, Sakai (JP); Seiji Norita, Sakai (JP); Satoshi Nishida, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/024,157

(22) PCT Filed: Feb. 25, 2014

(86) PCT No.: PCT/JP2014/054399
§ 371 (c)(1),
(2) Date: Mar. 23, 2016

(87) PCT Pub. No.: WO2015/045437
PCT Pub. Date: Apr. 2, 2015

(65) Prior Publication Data
US 2016/0238118 A1    Aug. 18, 2016

(30) Foreign Application Priority Data

Sep. 27, 2013 (JP) ................... 2013-202779
Sep. 27, 2013 (JP) ................... 2013-202780
Sep. 27, 2013 (JP) ................... 2013-202781

(51) Int. Cl.
*F16H 47/04* (2006.01)
*A01D 69/03* (2006.01)
(Continued)

(52) U.S. Cl.
CPC ............. *F16H 47/04* (2013.01); *A01D 41/02* (2013.01); *A01D 69/03* (2013.01); *A01D 69/06* (2013.01);
(Continued)

(58) Field of Classification Search
CPC ........ F16H 47/04; F16H 57/021; F16H 47/02; A01F 12/56; A01D 41/02; A01D 69/06; A01D 69/03; B60K 17/10
See application file for complete search history.

(56) References Cited

U.S. PATENT DOCUMENTS 2,075,118 A * 3/1937 Krell ................. F16H 47/04
475/75
8,608,605 B2 * 12/2013 Hiraoka .......... B60W 30/18036
475/6

(Continued)

FOREIGN PATENT DOCUMENTS

JP    2007024172 A    2/2007
JP    200945991 A     3/2009
(Continued)

OTHER PUBLICATIONS

Japanese Office Action dated Feb. 7, 2017 in Japanese Patent Application No. 2013-202779.

*Primary Examiner* — Darlene P Condra
(74) *Attorney, Agent, or Firm* — The Webb Law Firm

(57) ABSTRACT

Provided is a combine with a speed-change power transmission apparatus including: a hydraulic static continuously variable transmission unit that receives an input of drive force from an engine, and subjects the drive force to speed change; and a planetary power transmission unit that combines the drive force from the engine and an output from the continuously variable transmission unit and outputs a combined drive force to a travelling apparatus, wherein a power transmission case can be made lighter at low cost. In this combine, a continuously variable transmission case portion of a power transmission case, which houses a continuously variable transmission unit, is formed integrally with a planetary power transmission case portion of the power transmission case, which houses a planetary power transmission
(Continued)

unit. A partition that separates a continuously variable transmission compartment of the continuously variable transmission case portion and a planetary power transmission compartment of the planetary power transmission case portion from each other is provided within the power transmission case, the continuously variable transmission compartment housing the continuously variable transmission unit, and the planetary power transmission compartment housing the planetary power transmission unit.

21 Claims, 20 Drawing Sheets

(51) Int. Cl.
    *A01D 69/06*     (2006.01)
    *B60K 17/10*     (2006.01)
    *F16H 47/02*     (2006.01)
    *F16H 57/021*     (2012.01)
    *A01D 41/02*     (2006.01)
    *A01F 12/56*     (2006.01)

(52) U.S. Cl.
    CPC .............. *A01F 12/56* (2013.01); *B60K 17/10* (2013.01); *F16H 47/02* (2013.01); *F16H 57/021* (2013.01)

(56) References Cited

U.S. PATENT DOCUMENTS

| | | | | |
|---|---|---|---|---|
| 2008/0214351 A1* | 9/2008 | Katayama | ............... | F16H 47/04 475/296 |
| 2009/0149292 A1* | 6/2009 | Hiraoka | ................. | B60K 17/08 475/302 |
| 2009/0156345 A1* | 6/2009 | Ishimori | ................. | F16H 47/04 475/116 |
| 2009/0270212 A1* | 10/2009 | Ueda | ....................... | F16H 47/04 475/74 |
| 2009/0280944 A1* | 11/2009 | Hiraoka | ................ | F16H 37/042 475/116 |
| 2014/0155212 A1 | 6/2014 | Kato et al. | | |

FOREIGN PATENT DOCUMENTS

| | | |
|---|---|---|
| JP | 201169416 A | 4/2011 |
| JP | 2012211672 A | 11/2012 |
| JP | 2013040633 A | 2/2013 |
| JP | 2013173392 A | 9/2013 |
| JP | 2013188185 A | 9/2013 |
| JP | 2013190069 A | 9/2013 |

* cited by examiner

Fig.17

| ROTATION DIRECTION | FORWARD ROTATION | | | | REVERSE ROTATION | | |
|---|---|---|---|---|---|---|---|
| ROTATION SPEED | HIGH-SPEED (FH) | MID-SPEED (FM) | LOW-SPEED (FL) | | LOW-SPEED (RL) | MID-SPEED (RM) | HIGH-SPEED (RH) |
| DRIVE MODE | (SECOND MODE HMT MODE) | (SECOND MODE HMT MODE) | (FIRST MODE HST MODE) | | (FIRST MODE HST MODE) | (SECOND MODE HMT MODE) | (SECOND MODE HMT MODE) |
| CONTINUOUSLY VARIABLE TRANSMISSION UNIT(40) | R | F | F | | R | R | F |
| FORWARD CLUTCH(66) | ON | ON | OFF | | OFF | OFF | OFF |
| REVERSE CLUTCH(68) | OFF | OFF | OFF | | OFF | ON | ON |
| SWITCHING CLUTCH(70) | OFF | OFF | ON | | ON | OFF | OFF |

NEUTRAL POSITION (MAIN SHIFT LEVER[N])

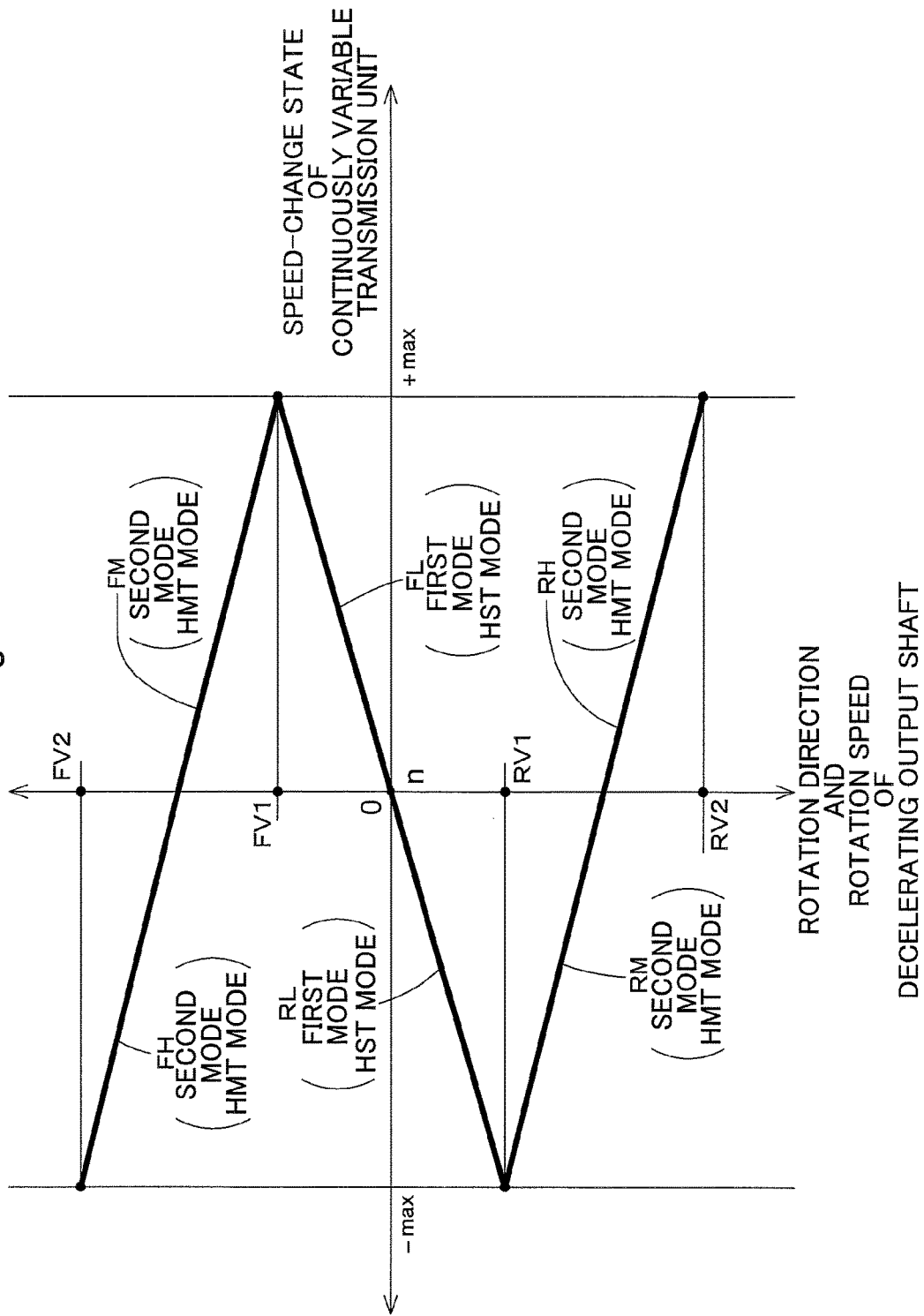

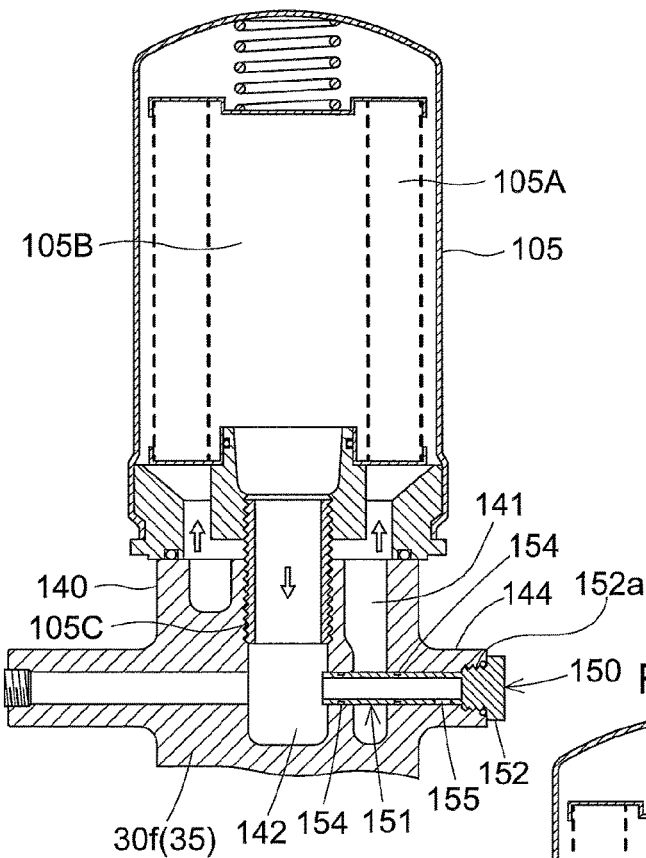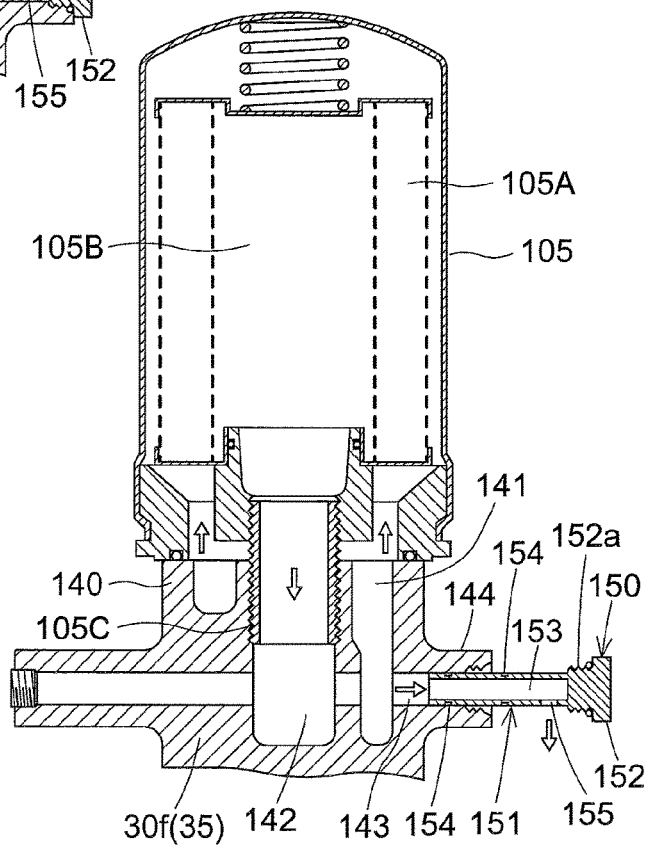

COMBINE

CROSS-REFERENCE TO RELATED APPLICATIONS

This application is the United States national phase of International Application No. PCT/JP2014/054399 filed Feb. 25, 2014, and claims priority to Japanese Patent Application Nos. 2013-202779, 2013-202780, and 2013-202781, all filed Sep. 27, 2013, the disclosures of which are hereby incorporated in their entirety by reference.

TECHNICAL FIELD

The present invention relates to a combine.

BACKGROUND ART

In the combine above, upon a speed change operation being performed with a continuously variable transmission unit, the rotation speed of drive force that is output from the continuously variable transmission unit changes, the rotation speed of a combined drive force that is output by a planetary power transmission unit combining the drive force from the continuously variable transmission unit and drive force from an engine changes, and the combined drive force having the rotation speed thus changed is transmitted to a travelling apparatus. Thus, it is possible to drive the travelling apparatus while smoothly changing the speed of the travelling apparatus by performing a simple speed change operation with a continuously variable transmission unit. Also, since the drive force from the continuously variable transmission unit and the drive force from the engine are combined by the planetary power transmission unit and the combined drive force is transmitted to the travelling apparatus, it is possible to efficiently transmit the engine's output to the travelling apparatus.

Conventional examples of this kind of combine include the combine disclosed in Patent Document 1. This combine includes an input shaft that receives an input of drive force from the engine, and a hydraulic continuously variable transmission that serves as a hydraulic continuously variable transmission unit is configured with a hydraulic continuously variable transmission unit that has: a hydraulic pump that receives an input of the drive force of the input shaft; and a hydraulic motor that is driven by the hydraulic pump, and a configuration is adopted in which the drive force of the input shaft and the output from the hydraulic continuously variable transmission apparatus are input to the planetary power transmission unit and combined, and the combined drive force, which is output from the planetary power transmission unit, is transmitted to the travelling apparatus.

PRIOR ART DOCUMENTS

Patent Documents

Patent Document 1; JP 2012-211672A

DISCLOSURE OF THE INVENTION

Problem to be Solved by the Invention

[1] If conventional technology is adopted, a lot of manufacturing work is required to reduce the weight of the power transmission case that houses the continuously variable transmission unit and the planetary power transmission unit.

Specifically, a continuously variable transmission compartment of the power transmission case, the continuously variable transmission compartment housing the continuously variable transmission unit, is required to be fully or substantially fully filled with hydraulic oil, due to the structure of the continuously variable transmission unit. If a planetary power transmission compartment of the power transmission case, the planetary power transmission compartment housing the planetary power transmission unit, is fully or substantially fully filled with lubricant oil, the drive resistance of the planetary power transmission unit increases due to the lubricant oil. Therefore, not the full amount, but the minimum required amount of lubricant oil is to be stored in the planetary power transmission compartment. For this reason, it is required that the continuously variable transmission compartment and the planetary power transmission compartment are separate from each other so that oil does not freely move between them.

A high hydraulic oil pressure is applied to a drive circuit that connects the hydraulic pump and the hydraulic motor, and therefore a port block, with which the drive circuit is formed, is required to be manufactured with high-strength material such as iron.

Specifically, if conventional technology is adopted, the continuously variable transmission compartment and the planetary power transmission compartment are separated from each other with a port block, and therefore, in order to manufacture the power transmission case with lightweight material such as an aluminum alloy, a continuously variable transmission case portion of the power transmission case, the continuously variable transmission case portion housing the continuously variable transmission unit, and a planetary power transmission case portion of the power transmission case, the planetary power transmission case portion housing the planetary power transmission unit, are required to be separately manufactured.

The present invention aims to provide a combine in which the power transmission case can be made lighter at low cost.

[2] In the combine above, if the rotation speed of the drive force input to the continuously variable transmission unit is reduced, a drive failure is likely to occur in the continuously variable transmission unit. If a configuration is adopted in which drive force with a sufficiently high rotation speed is input to the input shaft to avoid a drive failure of the continuously variable transmission unit, there is an increase in the rotation speed of a planetary output shaft that is provided to output the combined drive force to the planetary power transmission unit. Consequently, if the combined drive force from the planetary power transmission unit is output to the travelling power transmission apparatus without a change in the rotation speed, the driving speed of the travelling apparatuses becomes too high. If the travelling power transmission apparatus is provided with a deceleration function in order to prevent the driving speed of the travelling apparatus from becoming too high, the size and weight of the travelling power transmission apparatus increase.

The present invention aims to provide a combine that is capable of avoiding a driving failure of the continuously variable transmission unit, with a travelling power transmission apparatus that is not provided with any special decelerating function, as well as capable of driving the travelling apparatus while smoothly changing the speed of the travelling apparatus with a simple operation, and capable of efficiently transmitting the engine's output to the travelling apparatus.

[3] This kind of combine is provided with an oil filter for hydraulic oil that is to be supplied to the continuously variable transmission unit. Also, it is advantageous if a motor control valve mechanism that performs a speed change operation with the hydraulic motor included in the continuously variable transmission unit is provided, because the speed change range becomes wide.

The oil filter requires replacement after having been used for a certain period of time. When performing maintenance work such as replacing, checking, or fixing the oil filter and the motor control valve mechanism, if it is difficult to secure a work space or it is difficult to reach them for example, time required for maintenance work becomes long.

The present invention aims to provide a combine that is capable of being equipped with an oil filter and a motor control valve mechanism such that maintenance work is easy.

Means for Solving Problem

[1] The Following is a Means for Solving the Problem Corresponding to Problem [1].

A combine according to one aspect of the present invention is a combine that is provided with a speed-change power transmission apparatus including: a hydraulic static continuously variable transmission unit that has a hydraulic pump and a hydraulic motor, receives an input of drive force from an engine, and subjects the drive force to speed change; a planetary power transmission unit that combines the drive force from the engine and an output from the continuously variable transmission unit and outputs a combined drive force to a travelling apparatus; and a power transmission case that houses the continuously variable transmission unit and the planetary power transmission unit, wherein a continuously variable transmission case portion of the power transmission case is formed integrally with a planetary power transmission case portion of the power transmission case, the continuously variable transmission case portion housing the continuously variable transmission unit, and the planetary power transmission case portion housing the planetary power transmission unit, and a partition that separates a continuously variable transmission compartment of the continuously variable transmission case portion and a planetary power transmission compartment of the planetary power transmission case portion from each other is provided within the power transmission case, the continuously variable transmission compartment housing the continuously variable transmission unit, and the planetary power transmission compartment housing the planetary power transmission unit.

With this configuration, the continuously variable transmission compartment and the planetary power transmission compartment are separated by the partition provided within the power transmission case. Therefore, even though the continuously variable transmission case portion of the power transmission case is formed integrally with the planetary power transmission case portion, the hydraulic oil in the continuously variable transmission compartment does not flow out to the planetary power transmission compartment, and the continuously variable transmission case portion can be manufactured at the same time as the planetary power transmission case portion, with lightweight material.

Thus, according to this aspect of the present invention, it is possible to manufacture a lightweight power transmission case at low cost, and to obtain a combine that is provided with a speed-change power transmission apparatus with a convenient speed change function so as to be advantageous in terms of weight and cost.

In one aspect of the present invention, it is preferable that the planetary power transmission case portion is configured to be dividable into a first divisional planetary power transmission case portion and a second divisional planetary power transmission case portion, the first divisional planetary power transmission case portion being formed integrally with the continuously variable transmission case portion and being provided with the partition, and the second divisional planetary power transmission case portion being located opposite the continuously variable transmission case portion with respect to the first divisional planetary power transmission case portion.

According to this aspect of the present invention, it is possible to widely open the planetary power transmission case portion by dividing the planetary power transmission case portion into the first divisional planetary power transmission case portion and the second divisional planetary power transmission case portion, and thus it is easy to assemble the planetary power transmission unit.

In one aspect of the present invention, it is preferable that a port block with which a drive circuit that connects the hydraulic pump and the hydraulic motor to each other is formed is attached to an end portion of the continuously variable transmission case portion, the end portion being opposite a side to which the planetary power transmission case portion is coupled.

According to this aspect of the present invention, it is possible to manufacture the continuously variable transmission case portion integrally with the planetary power transmission case portion despite the port block being manufactured with a material different from that of the power transmission case, and it is thus possible to obtain a lightweight power transmission case at low cost while providing the port block with high strength. Also, it is possible to easily attach/detach the port block to/from the end portion side to which the planetary power transmission case portion of the continuously variable transmission case portion is not coupled, and it is thus easy to perform work such as checking the drive circuit.

In one aspect of the present invention, it is preferable that the power transmission case is formed such that the continuously variable transmission case portion and the planetary power transmission case portion are arranged along a lateral direction of the travelling machine body, and when seen from above the travelling machine body, the power transmission case has a shape in which an end of the continuously variable transmission case portion on a rear side of the travelling machine body is located closer to a front of the travelling machine body than an end of the planetary power transmission case portion on the rear side of the travelling machine body is.

According to this aspect of the present invention, it is possible to form a space having a cutout-like shape when seen from above the upper surface of the travelling machine body in the lateral end portion on the rear end side of the power transmission case. Thus, if the valve mechanism is disposed within this space, it is possible to achieve compactness such that the valve mechanism does not or substantially does not project backward or in the lateral direction from the power transmission case, for example. Also, it is possible to obtain an advantageous structure with which, for example, the front side of the valve mechanism is covered with the continuously variable transmission case portion, the lateral side is covered with the planetary power transmission case portion, and the valve mechanism can be protected with the continuously variable transmission case portion and the planetary power transmission case portion being utilized as guard means.

In one aspect of the present invention, it is preferable that a speed-change control valve mechanism that performs a speed change operation with the hydraulic pump is disposed within a space that is formed by providing the power transmission case with the shape in which, when seen from above the travelling machine body, the end of the continuously variable transmission case portion on the rear side of the travelling machine body is located closer to the front of the travelling machine body than the end of the planetary power transmission case portion on the rear side of the travelling machine body is.

According to this aspect of the present invention, it is possible to dispose the speed-change control valve mechanism near the hydraulic pump that is to be controlled, thereby reducing the length of the hydraulic oil path that connects the speed-change control valve mechanism and the hydraulic pump, and the speed-change control valve mechanism can be provided so as to achieve compactness such that it does not or substantially does not project backward or in the lateral direction from the power transmission case, for example. Also, it is possible to protect the speed-change control valve mechanism by covering the front side and the lateral side of the speed-change control valve mechanism with the continuously variable transmission case portion and the planetary power transmission case portion.

In one aspect of the present invention, it is preferable that the engine is located closer to a rear of the travelling machine body than the power transmission case is.

According to this aspect of the present invention, although the engine is located closer to the rear of the travelling machine body than the power transmission case is, the gap between the continuously variable transmission case portion and the engine is wider than the gap between the planetary power transmission case portion and the engine, and it is possible to widely open the area behind the space that has the cutout-like shape when seen from above the travelling machine body and that is formed in the lateral end portion on the rear end side of the power transmission case. Thus, it is easy to use the space in order to dispose the valve mechanism, for example.

In one aspect of the present invention, it is preferable that the drive force from the engine is input to the planetary power transmission unit and the continuously variable transmission unit from a laterally outer side of the planetary power transmission case portion, the laterally outer side being opposite a side to which the continuously variable transmission case portion is coupled.

According to this aspect of the present invention, the structure of the continuously variable transmission unit side can be simpler than in the case where the drive force is input from the continuously variable transmission unit side, and it is possible to improve the sealing properties of the continuously variable transmission unit side, which is required to be filled with a larger amount of oil compared to the planetary power transmission unit side.

In one aspect of the present invention, it is preferable that the power transmission case is formed such that the continuously variable transmission case portion and the planetary power transmission case portion are arranged along a lateral direction of the travelling machine body, the combine is provided with a travelling power transmission case that is coupled to a lateral side portion of the planetary power transmission case portion, that receives an input of a combined drive force from the planetary power transmission unit, and that transmits the combined drive force to the travelling apparatus, the lateral side portion being opposite a side to which the continuously variable transmission case portion is coupled, the travelling power transmission case is disposed such that an upper end thereof is located lower than an upper end of the planetary power transmission case portion, and the drive force from the engine is input to the planetary power transmission unit and the continuously variable transmission unit from a laterally outer side of the planetary power transmission case portion, the laterally outer side being opposite a side to which the continuously variable transmission case portion is coupled and being above the travelling power transmission case.

According to this aspect of the present invention, the space formed due to the difference in height between the upper end of the planetary power transmission case portion and the upper end of the travelling power transmission case is used as a path for transmitting the input power to the planetary power transmission unit and the continuously variable transmission unit. Therefore, it is possible to effectively use space.

In one aspect of the present invention, it is preferable that the power transmission case is formed such that the continuously variable transmission case portion and the planetary power transmission case portion are arranged along a lateral direction of the travelling machine body, an upper portion of the power transmission case is provided with an inclined part formed to have an inclined shape whose height decreases toward a rear side of the travelling machine body, and a valve mechanism that switches a drive mode of the speed-change power transmission apparatus to a first mode and a second mode and that switches an output rotation direction of the speed-change power transmission apparatus to a forward rotation direction and a reverse rotation direction is disposed on the inclined part, the first mode being a mode in which the continuously variable transmission unit performs a speed change action and the planetary power transmission unit does not perform a speed change action, and the second mode being a mode in which the continuously variable transmission unit and the planetary power transmission unit perform a speed change action.

According to this aspect of the present invention, an empty space is formed above the power transmission case by providing the upper portion of the power transmission case with the inclined part, and the valve mechanism is provided on the inclined part such that the empty space is utilized as a space for housing the valve mechanism. Therefore, it is possible to support the valve mechanism on the power transmission case so as to achieve compactness.

[2] The Following is a Means for Solving the Problem Corresponding to Problem [2].

A combine according to one aspect of the present invention is a speed-change power transmission apparatus that includes: an input shaft that receives an input of drive force from an engine; a hydraulic static continuously variable transmission unit that subjects drive force of the input shaft to speed change; and a planetary power transmission unit that combines the drive force of the input shaft and drive force of a continuously variable output shaft of the continuously variable transmission unit and outputs a combined drive force from a planetary output shaft; and a travelling power transmission apparatus that transmits the combined drive force from the planetary output shaft to a travelling apparatus, wherein the speed-change power transmission apparatus is provided with a decelerating output shaft that is interlocked with the planetary output shaft via a decelerating power transmission mechanism, and that decelerates and outputs the combined drive force from the planetary output shaft to the travelling power transmission apparatus.

With this configuration, upon a speed-change operation being performed with the continuously variable transmission unit, the rotation speed of drive force that is output from the continuously variable output shaft of the continuously variable transmission unit changes, the rotation speed of a combined drive force that is output from the planetary output shaft by the planetary power transmission unit combining the drive force from the continuously variable output shaft and drive force from the input shaft changes, and the combined drive force from the planetary output shaft is output from the decelerating output shaft to the travelling power transmission apparatus and is transmitted to the travelling apparatus. Therefore, it is possible to drive the travelling apparatus while smoothly changing the speed of the travelling apparatus by performing a simple speed change operation with the continuously variable transmission unit. Also, since the drive force from the continuously variable output shaft and the drive force from the input shaft are combined by the planetary power transmission unit, and the combined drive force is transmitted to the travelling apparatus, it is possible to efficiently transmit the engine's output to the travelling apparatus.

As the rotation speed of the drive force input to the input shaft is set to an appropriate rotation speed, the rotation speed of the drive force input to the continuously variable transmission unit does not become slow, and it is possible to prevent a drive failure from occurring in the continuously variable transmission unit. By setting the rotation speed of the drive force input to the input shaft to be a rotation speed at which no drive failure occurs in the continuously variable transmission unit, the combined drive force from the planetary output shaft is decelerated by the decelerating output shaft and is then transmitted to the travelling power transmission apparatus even if the rotation speed of the combined drive force output from the planetary output shaft becomes fast. Therefore, it is possible to prevent the driving speed of the travelling apparatus from becoming too fast. Thus, it is possible to omit a decelerating function, which is the function of preventing the driving speed of the travelling apparatus from becoming too fast, from the travelling power transmission apparatus.

Therefore, according to this aspect of the present invention, it is possible to drive the travelling apparatus while smoothly changing the speed of the travelling apparatus by performing a simple speed change operation with a continuously variable transmission unit, and to nimbly work while preventing a drive failure from occurring in the continuously variable transmission unit. Also, it is possible to realize a simple lightweight travelling power transmission apparatus without any special deceleration mechanism while providing the travelling power transmission apparatus with the capability of efficiently transmitting the engine's output to the travelling apparatus and with a high fuel efficiency.

In one aspect of the present invention, it is preferable that the speed-change power transmission apparatus is disposed closer to a front of the travelling machine body than the engine is, and the input shaft and the continuously variable output shaft are disposed closer to the front of the travelling machine body than the decelerating output shaft is.

In this aspect of the present invention, it is easy to position the parts on which the continuously variable transmission unit and the planetary power transmission unit of the speed-change power transmission apparatus are located to be closer to the front of the travelling machine body than the part on which the decelerating output shaft of the speed-change power transmission apparatus is located, and to avoid interference between the speed-change power transmission apparatus and the engine. Also, it is possible to set the gap between the input shaft and the engine to be greater than the gap between the decelerating output shaft and the engine, and even in the case where the engine and the input shaft are interlocked with a power transmission belt, it is possible to appropriately dispose a tension means that operates the power transmission belt using tension, between the engine and the input shaft, and it is possible to realize appropriate power transmission from the engine to the input shaft with the power transmission belt being in a predetermined state of tension.

In one aspect of the present invention, it is preferable that the input shaft and the continuously variable output shaft are arranged along a top-to-bottom direction of the travelling machine body.

According to this aspect of the present invention, it is possible to arrange the hydraulic pump and the hydraulic motor, which are included in the continuously variable transmission unit, along the top-to-bottom direction of the travelling machine body, and thus it is easy to form and attach a drive circuit that connects the hydraulic pump and the hydraulic motor, and an actuator that operates the hydraulic pump.

In one aspect of the present invention, it is preferable that the combine is provided with a power transmission mechanism that transmits the drive force of the input shaft to the planetary power transmission unit, the power transmission mechanism is provided with a relay shaft, the drive force of the input shaft is transmitted to the planetary power transmission unit as a positive rotation force when the relay shaft does not intervene, and is transmitted to the planetary power transmission unit as a reverse rotation force when the relay shaft intervenes, and the relay shaft is located between the input shaft and the continuously variable output shaft in a top-to-bottom direction of the travelling machine body, and is located behind the input shaft and the continuously variable output shaft in a front-rear direction of the travelling machine body.

If the relay shaft is located in front of the input shaft and the continuously variable output shaft in a front-rear direction of the travelling machine body, the relay shaft is located opposite the decelerating output shaft with respect to the input shaft and the continuously variable output shaft, and therefore the length of the speed-change power transmission apparatus in the front-rear direction of the travelling machine body becomes long due to the relay shaft being provided. In contrast, according to this aspect of the present invention, it is possible to prevent the length of the speed-change power transmission apparatus in the front-rear direction of the travelling machine body from becoming long due to the relay shaft being provided.

Specifically, by arranging the input shaft and the continuously variable output shaft in front of the decelerating output shaft in the top-to-bottom direction in order to realize appropriate power transmission from the engine to the input shaft and to make it easy to form and attach the drive circuit and the actuator, an empty space is formed in the part that is closer to the decelerating output shaft than the input shaft and the continuously variable output shaft are, and that is between the input shaft and the continuously variable output shaft in the top-to-bottom direction of the travelling machine body. Since the relay shaft is disposed such that this empty space is utilized as a space for housing the relay shaft, it is possible to prevent the length of the speed-change power transmission apparatus in the front-rear direction of the travelling machine body from becoming long due to the relay shaft being provided.

Thus, it is possible to reduce the length of the speed-change power transmission apparatus in the front-rear direction of the travelling machine body and the speed-change power transmission apparatus can be disposed within a relatively small space.

In one aspect of the present invention, it is preferable that the relay shaft is located above the decelerating output shaft.

According to this aspect of the present invention, the speed-change power transmission apparatus can be disposed in front of the engine, with the input shaft being not too close to and not too far from the engine. Therefore, even in the case where the engine and the input shaft are interlocked with a power transmission belt, it is possible to appropriately dispose a tension means that operates the power transmission belt using tension, between the engine and the input shaft, and it is possible to realize appropriate power transmission from the engine to the input shaft with the power transmission belt being in a predetermined tension state.

In one aspect of the present invention, it is preferable that the input shaft, the continuously variable output shaft, and the relay shaft are located higher than the decelerating output shaft.

According to this aspect of the present invention, the top-to-bottom direction of the travelling machine body, along which the input shaft and the continuously variable output shaft are arranged, can be set to be vertical or approximately vertical, and therefore it is even easier to form and attach a drive circuit that connects the hydraulic pump and the hydraulic motor, and an actuator that operates the hydraulic pump.

In one aspect of the present invention, it is preferable that the combine is provided with a power transmission case that houses the continuously variable transmission unit and the planetary power transmission unit, the relay shaft is provided on an upper side within a planetary power transmission case portion of the power transmission case, the planetary power transmission case portion housing the planetary power transmission unit, and an upper portion of the planetary power transmission case portion is provided with an inclined part formed to have an inclined shape whose height decreases toward a rear side of the travelling machine body.

According to this aspect of the present invention, the relay shaft is located between the input shaft and the continuously variable output shaft in the top-to-bottom direction of the travelling machine body, and is located behind the input shaft and the continuously variable output shaft in the front-rear direction of the travelling machine body. Attention is focused on the positional relationship among the relay shaft, the input shaft and the continuously variable output shaft, and the upper portion of the planetary power transmission case portion is provided with the inclined part. Therefore, an empty space can be formed above the planetary power transmission case portion. Therefore, for example, if the valve mechanism is disposed on the inclined part such that the empty space is utilized as a space for housing the valve mechanism, it is possible to support the valve mechanism on the power transmission case so as to achieve compactness.

In one aspect of the present invention, it is preferable that the combine is provided with a valve mechanism that switches a drive mode of the decelerating output shaft to a first mode and a second mode and that switches a rotation direction of the decelerating output shaft to a forward rotation direction and a reverse rotation direction, the first mode being a mode in which the continuously variable transmission unit performs a speed change action and the planetary power transmission unit does not perform a speed change action, and the second mode being a mode in which the continuously variable transmission unit and the planetary power transmission unit perform a speed change action, and the valve mechanism is disposed on the inclined part of the planetary power transmission case portion.

In this aspect of the present invention, the valve mechanism is disposed in the planetary power transmission case portion such that the empty space formed above the planetary power transmission case portion by providing the upper portion of the planetary power transmission case portion with the inclined portion is utilized as a space for housing the valve mechanism. Therefore, the valve mechanism can be supported on the power transmission case so as to achieve compactness.

In one aspect of the present invention, it is preferable that the power transmission case is formed such that the continuously variable transmission case portion and the planetary power transmission case portion are arranged along a lateral direction of the travelling machine body, the power transmission case is provided with a partition that separates the continuously variable transmission unit and the planetary power transmission unit from each other, and the valve mechanism is disposed on a part of the inclined part, the part being located close to the partition.

According to this aspect of the present invention, the valve mechanism can be located close to the partition. Therefore, when connecting the valve mechanism and the target to be controlled to each other with a hydraulic oil path formed in the partition, it is possible to easily connect the valve mechanism and the hydraulic oil path with a short connection oil path.

[3] The Following is a Means for Solving the Problem Corresponding to Problem [3].

A combine according to one aspect of the present invention is an engine provided below an operation unit; and a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus, wherein the speed-change power transmission apparatus is disposed below the operation unit and closer to a front of a travelling machine body than the engine is, and an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction.

With this configuration, since the oil filter and the motor control valve mechanism are disposed on the front surface portion or the lateral outer surface portion of the speed-change power transmission apparatus that is disposed closer to the front of the travelling machine body than the engine is, it is easy to secure a work space on the front side of the travelling machine body or the laterally outer side of the travelling machine body with respect to the oil filter and the motor control valve mechanism. Also, since the oil filter and the motor control valve mechanism are arranged along the top-to-bottom direction, even if the lateral width of the work space on the front side of the travelling machine body or the laterally outer side of the travelling machine body with respect to the oil filter and the motor control valve mechanism is relatively small, it is easy to reach the oil filter and the motor control valve mechanism.

Therefore, according to this aspect of the present invention, it is possible to efficiently perform maintenance work on the oil filter and the motor control valve mechanism because it is easy to secure a work space and it is easy to reach them.

In one aspect of the present invention, it is preferable that the oil filter and the motor control valve mechanism are disposed on the front surface portion.

According to this aspect of the present invention, the oil filter and the motor control valve mechanism can be compactly disposed within the range of the lateral width of the speed-change power transmission apparatus.

In one aspect of the present invention, it is preferable that the oil filter is disposed above the motor control valve mechanism.

According to this aspect of the invention, it is possible to cover the area above the motor control valve mechanism with the oil filter. Therefore, advantageously, when the reaped stalks are conveyed above the speed-change power transmission apparatus for example, it is easy to prevent the reaped stalks thus conveyed from touching the motor control valve mechanism.

In one aspect of the present invention, it is preferable that the oil filter and the motor control valve mechanism are disposed on a part of the front surface portion, the part being close to a laterally outer side of the travelling body.

According to this aspect of the present invention, although the oil filter and the motor control valve mechanism are disposed on the front surface portion, the oil filter and the motor control valve mechanism are located close to the laterally outer side of the travelling body. Therefore, advantageously, when the reaped stalks are conveyed above the speed-change power transmission apparatus for example, it is easy to prevent the reaped stalks thus conveyed from touching the oil filter and the motor control valve mechanism.

In one aspect of the present invention, it is preferable that wherein the speed-change power transmission apparatus is provided with a power transmission case that houses the continuously variable transmission unit and the planetary power transmission unit, the power transmission case is provided with a continuously variable transmission compartment that houses the continuously variable transmission unit, a planetary power transmission compartment that houses the planetary power transmission unit, and a partition that separates the continuously variable transmission compartment and the planetary power transmission compartment from each other, and the oil filter and the motor control valve mechanism are disposed on a region of the front surface portion, the region overlapping the partition.

According to this aspect of the present invention, it is possible to firmly support the oil filter and the motor control valve mechanism on the part of the front surface portion, the part being reinforced by the partition. Also, in the case where the hydraulic oil path that connects the motor control valve mechanism and the hydraulic motor is formed in the partition, it is possible to connect the motor control valve mechanism to the hydraulic oil path with a short connection oil path.

In one aspect of the present invention, it is preferable that the oil filter and the motor control valve mechanism are disposed on the front surface portion, the combine is provided with: an accelerating hydraulic cylinder that acts to press against a swashplate of the hydraulic motor such that the swashplate is operated to incline toward an acceleration side, and a decelerating hydraulic cylinder that acts to press against the swashplate such that the swashplate is operated to incline toward a deceleration side, and the accelerating hydraulic cylinder and the decelerating hydraulic cylinder are separately disposed on left and right sides of the travelling machine body with respect to the swashplate.

According to this aspect of the present invention, it is possible to dispose the hydraulic oil path that connects the motor control valve mechanism and the accelerating hydraulic cylinder, so as to pass through the opposite side from the decelerating hydraulic cylinder with respect to the accelerating hydraulic cylinder, and the hydraulic oil path that connects the motor control valve mechanism and the decelerating hydraulic cylinder, so as to pass through the opposite side from the accelerating hydraulic cylinder with respect to the decelerating hydraulic cylinder. Therefore, compared to the case where both hydraulic oil paths respectively pass through the same sides as the accelerating hydraulic cylinder and the decelerating hydraulic cylinder, it is possible to form the hydraulic oil paths to be simple paths.

BRIEF DESCRIPTION OF THE DRAWINGS

FIG. 17 is an illustration showing a relationship among respective operation states of a forward clutch, a reverse clutch, and a switching clutch, a drive mode of the speed-change power transmission apparatus, a speed-change state of the continuously variable transmission unit, a rotation direction of the decelerating output shaft, and a rotation speed of the decelerating output shaft.

FIG. 18 is an illustration showing a relationship among the speed-change state of the continuously variable transmission unit, the rotation direction of the decelerating output shaft, and the rotation speed of the decelerating output shaft.

FIG. 19A is a cross-sectional view showing a filter supporting portion during a normal state, and FIG. 19B is a cross-sectional view showing the filter supporting portion during a drain operation.

BEST MODE FOR CARRYING OUT THE INVENTION

The following describes embodiments of the present invention based on the drawings.

Figure 1:
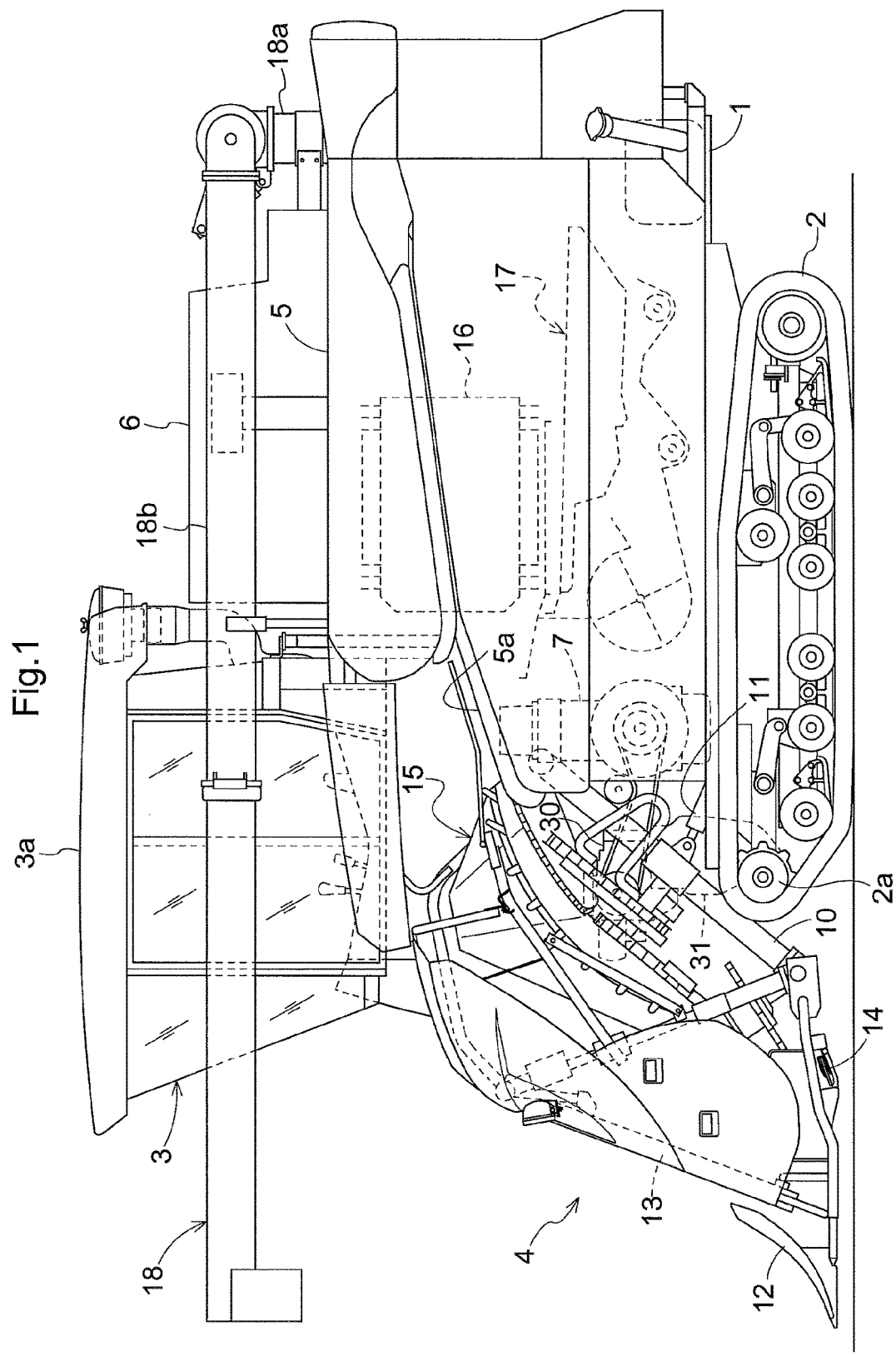
FIG. 1 is a left-side view showing an entire body of a combine.
Figure 2:
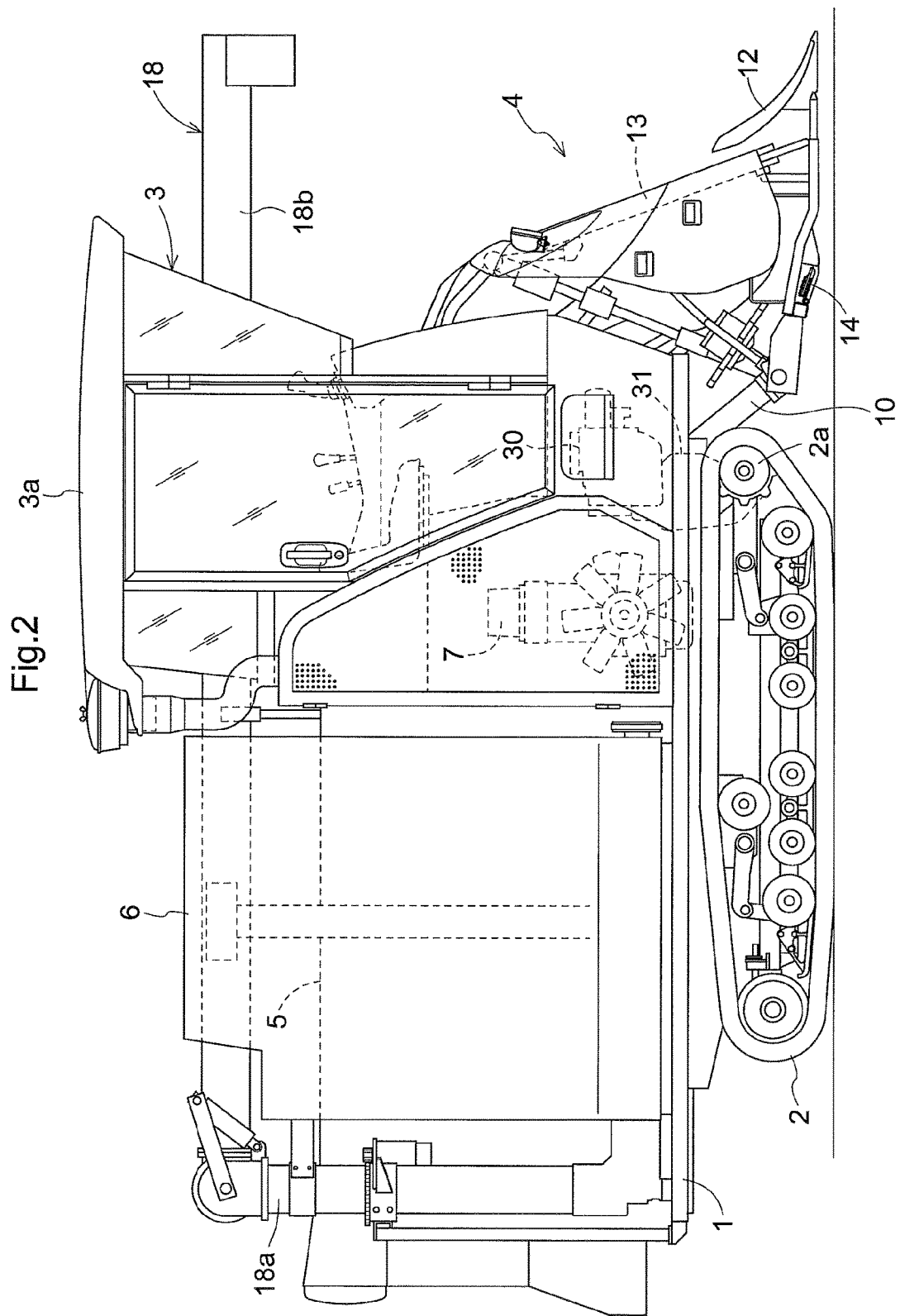
FIG. 2 is a right-side view showing the entire body of the combine.

FIG. 1 is a left-side view showing the entire body of a combine according to an embodiment of the present invention. FIG. 2 is a right-side view showing the entire body of the combine according to the embodiment of the present invention. As shown in FIGS. 1 and 2, the combine according to this embodiment of the present invention is provided with a pair of left and right crawler-type travelling apparatuses 2 located below a machine body frame 1, and includes a self-propelled travelling machine body propelled by the pair of left and right travelling apparatuses 2. The travelling machine body includes a boarding-type operation unit 3 that is provided at a right-end side front end portion, and the travelling machine body is configured such that the driver can board the operation unit 3 and operate the travelling machine body. The operation unit 3 includes an operation cabin 3a. A reaping unit 4 is coupled to a part that is a front end side part of the machine body frame 1 and that is located on the left side of the operation unit 3. A threshing apparatus 5 is provided in a left area of a rear portion of the machine body frame 1, and a grain tank 6 is provided in a right area of the rear portion of the machine body frame 1.

This combine is a six-row reaping harvester for rice, barley, or the like, and is configured as follows.

The reaping unit 4 includes a reaping unit frame 10 that extends forward from the front end portion of the machine body frame 1 so as to be vertically swingable. Upon the reaping unit frame 10 being swung by an up/down cylinder 11, the reaping unit frame 10 moves down and comes into a lowered working state in which the front end side of the reaping unit frame 10 is lowered close to the ground surface, or moves up and comes into an raised non-working state in which the reaping unit frame 10 is raised high above the ground surface. The reaping unit 4 reaps planted stalks and supplies the reaped stalks to the threshing apparatus 5 while being driven in the lowered working state.

Specifically, a plurality of dividers 12 that are arranged along the lateral direction of the travelling machine body and are supported on the front end portion of the reaping unit frame 10 guide reaping-target planted stalks out of the planted stalks, to raising apparatuses 13 located behind them. Each of the six raising apparatuses 13 performs raising processing by combing the planted stalks with raising claws. A clipper-type reaping apparatus 14, which is supported on the reaping unit frame 10 behind the raising apparatuses 13, cuts the base of the planted stalks in the raised states, and thus reaps the planted stalks. A conveying apparatus 15 that spans a position above the reaping apparatus 14 and a position in front of the threshing apparatus 5 conveys the reaped stalks toward the rear side of the travelling machine body while moving the reaped stalks toward the left side of the travelling machine body, and thus provides the reaped stalks to the conveyance starting portion of a threshing feed chain 5a.

In the threshing apparatus 5, the reaped stalks are conveyed toward the rear side of the travelling machine body with their base sides being clamped by the threshing feed chain 5a, the ear tip-sides of the reaped stalks are supplied to a threshing compartment where they are subjected to threshing processing with a threshing cylinder 16 that rotates about a threshing cylinder shaft extending in the front-rear direction of the travelling machine body, and grains obtained by threshing processing are supplied to a selection unit 17. The selection unit 17 performs selection processing to separate grains from dust, conveys grains that have undergone the selection processing to the outside of the threshing apparatus, and supplies the grains to the grain tank 6. The grain tank 6 stores the grains supplied from the threshing apparatus 5. The grain tank 6 includes an unloader 18 that has a vertical screw conveyer 18a disposed on the rear side along the top-to-bottom direction of the travelling machine body, and thus it is made possible to take out the stored grains with the unloader 18. The unloader 18 includes, in addition to the vertical screw conveyer 18a, a lateral screw conveyer 18b that extends from an upper end portion of the vertical screw conveyer 18a so as to be able to perform a vertical swing operation.

The following describes a power transmission apparatus that drives the reaping unit 4, the threshing apparatus 5, and the travelling apparatuses 2.

Figure 3:
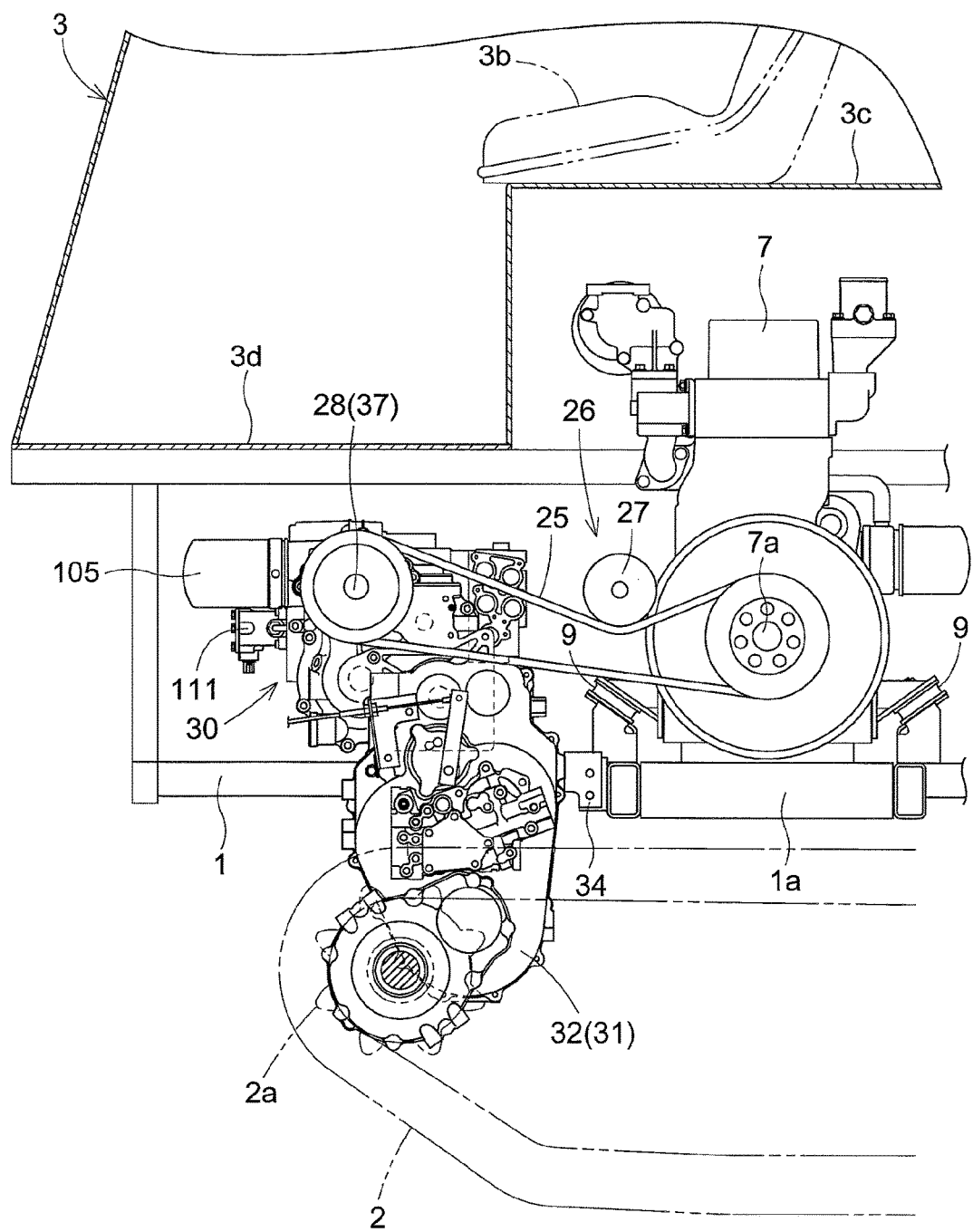
FIG. 3 is a right-side view showing a power transmission apparatus.
Figure 4:
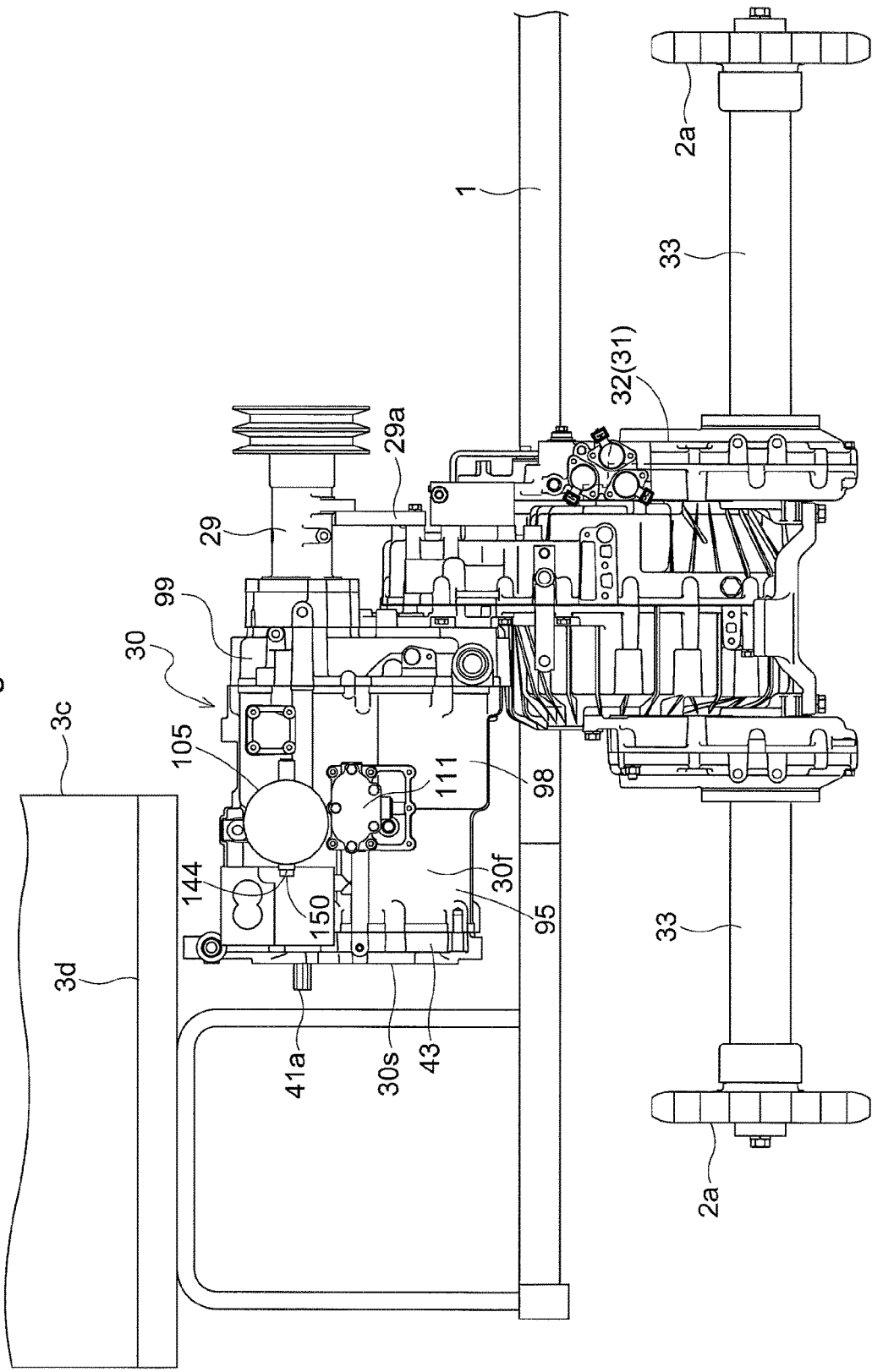
FIG. 4 is a front view showing the power transmission apparatus.
Figure 5:
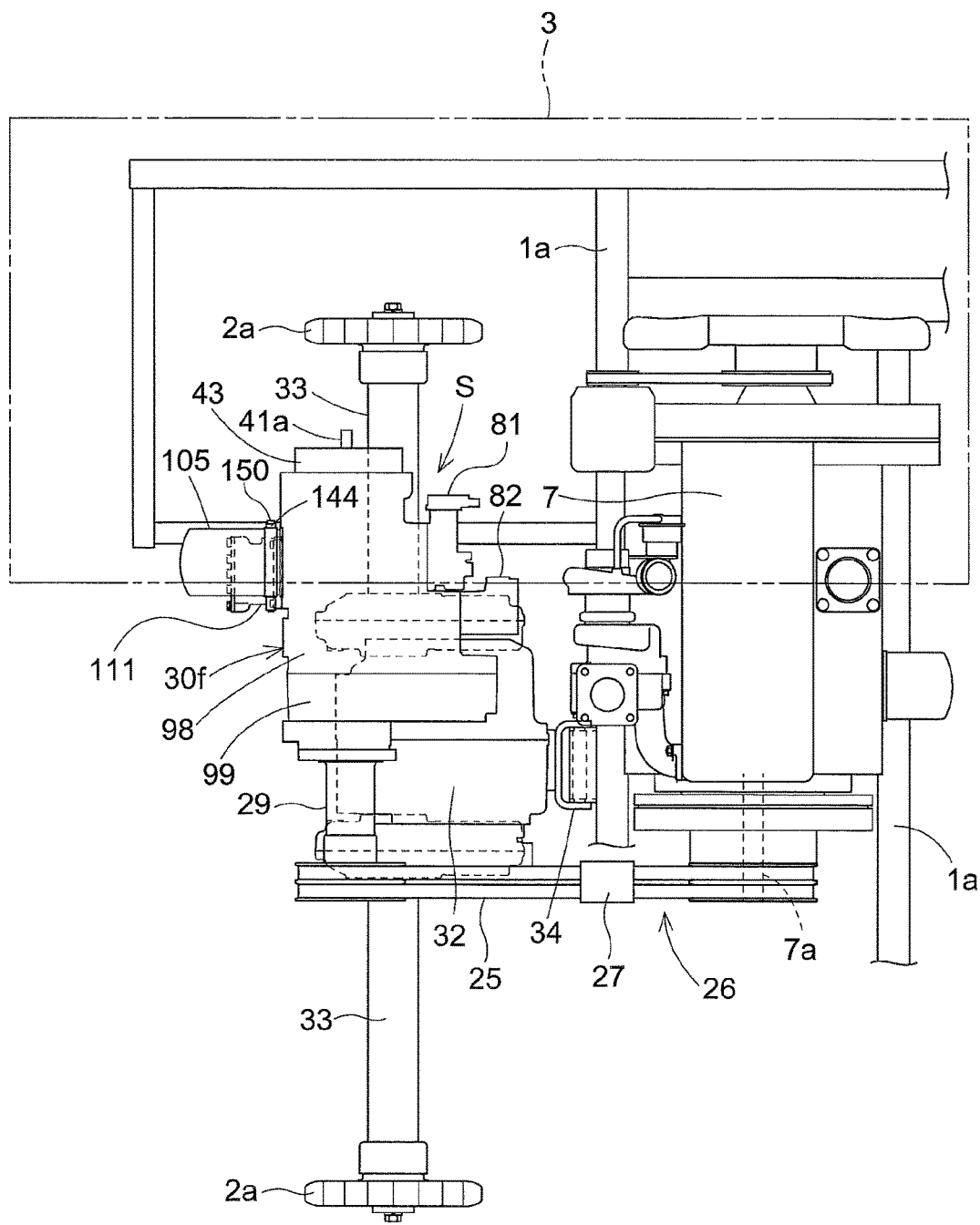
FIG. 5 is a plan view showing the power transmission apparatus.

As shown in FIGS. 3, 4, and 5, an engine 7 is provided below the operation unit 3. Specifically, the engine 7 is provided below a part, at which a driver's seat 3b is located, of the operation unit 3. The engine 7 is provided below a seat supporting base 3c that supports the driver's seat 3b on its top panel portion. The engine 7 is supported by an engine support frame portion 1a of the machine body frame 1, with a cushioning rubber 9 therebetween.

Figure 6:
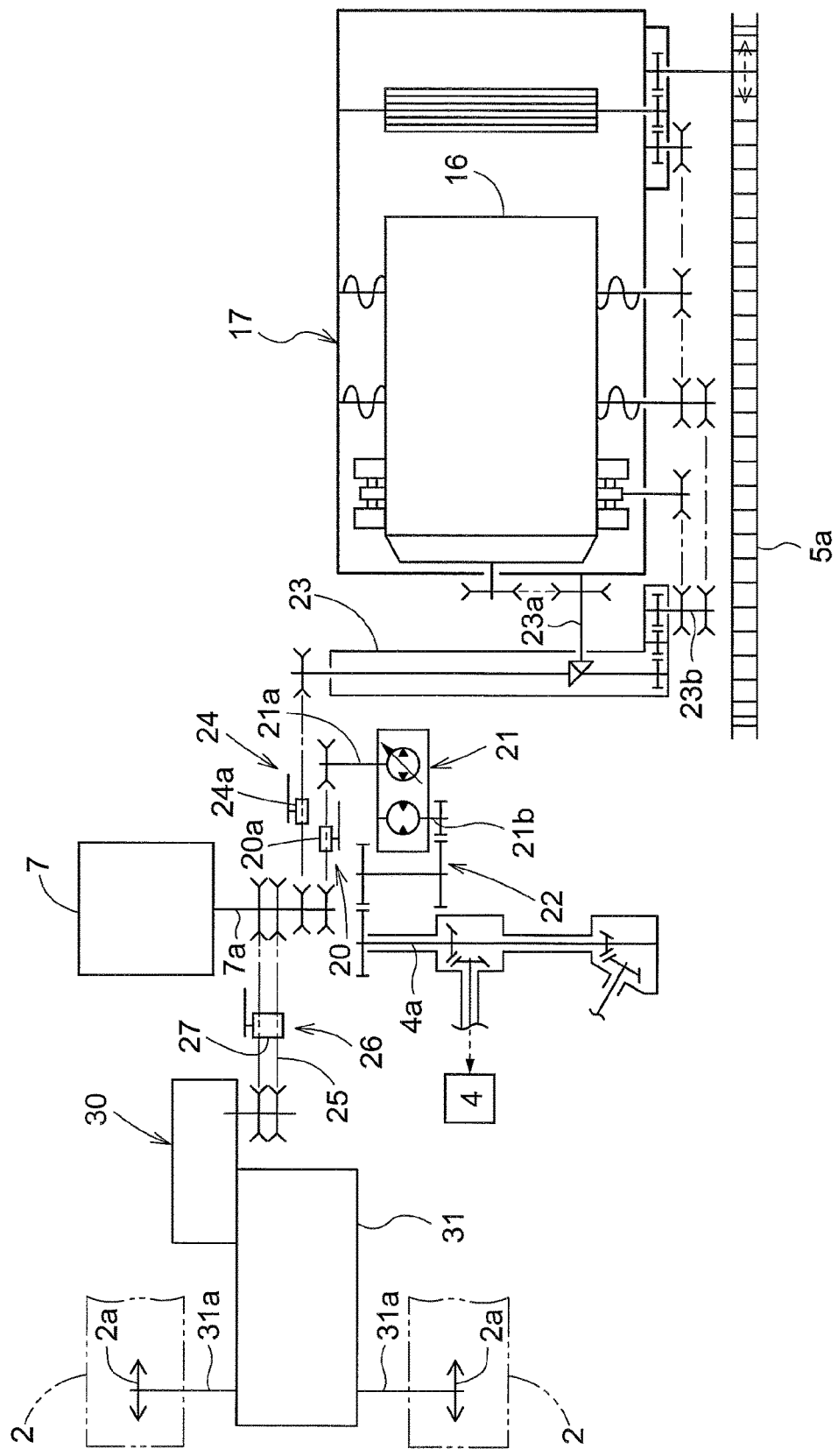
FIG. 6 is a schematic view showing the power transmission apparatus.

FIG. 6 is a schematic view showing the power transmission apparatus. As shown in FIG. 3 to FIG. 6, the engine 7 is provided with an output shaft 7a that extends inward along the lateral direction of the travelling machine body. A configuration is adopted in which drive force of the output shaft 7a is transmitted to an input shaft 21a of a reaping transmission apparatus 21 by an engine-side power transmission means 20 provided with a power transmission belt. A configuration is adopted in which drive force of an output shaft 21b of the reaping transmission apparatus 21 is transmitted to an input shaft 4a of the reaping unit 4 by a reaping unit-side power transmission means 22 having a power transmission gear. The reaping transmission apparatus 21 is configured with a hydraulic static continuously variable transmission apparatus. The engine-side power transmission means 20 is provided with a belt-tension type clutch 20a, and power transmission to the reaping transmission apparatus 21 can be turned on and off by an operation with the clutch 20a.

A configuration is adopted in which drive force of the output shaft 7a of the engine 7 is input to a threshing input case 23 by a threshing power transmission means 24 provided with a power transmission belt. A configuration is adopted in which drive force input to the threshing input case 23 is transmitted from a first output shaft 23a to the threshing cylinder 16. A configuration is adopted in which drive force input to the threshing input case 23 is transmitted from a second output shaft 23b to the selection unit 17 and the threshing feed chain 5a. The threshing power transmission means 24 is provided with a belt-tension type clutch 24a, and power transmission to the threshing cylinder 16, the selection unit 17, and the threshing feed chain 5a can be turned on and off by an operation with the clutch 24a.

A configuration is adopted in which drive force of the output shaft 7a of the engine 7 is input to a speed-change power transmission apparatus 30 by a travelling power transmission means 26 provided with a power transmission belt 25. The travelling power transmission means 26 is provided with a tension wheel 27 that provides the power transmission belt 25 with power transmission tensioning force. The tension wheel 27 has the function of a clutch, and power transmission to the speed-change power transmission apparatus 30 can be turned on and off by a switching operation with the tension wheel 27. A configuration is adopted in which the output from the speed-change power transmission apparatus 30 is transmitted to a travelling power transmission apparatus 31, and is further transmitted from a pair of left and right output shafts 31a, which are provided below the travelling power transmission apparatus 31, to crawler drive wheels 2a of the left and right travelling apparatuses 2. The left and right output shafts 31a are housed within a cylindrical output shaft case 33 that extends from a travelling power transmission case 32 provided in the travelling power transmission apparatus 31.

The travelling power transmission apparatus 31 is located between the respective front end portions of the left and right travelling apparatuses 2. The travelling power transmission apparatus 31 is supported on the front end portion of the machine body frame 1, with a coupling member 34 therebetween. The travelling power transmission apparatus 31 includes, in addition to the travelling power transmission case 32 supported on the machine body frame 1, a travelling transmission that is housed within the travelling power transmission case 32 and is configured to receive an input from the speed-change power transmission apparatus 30, divides the input drive force into a force for the left side and a force for the right side, and transmits the drive forces to the pair of left and right output shafts 31a. The travelling transmission is provided with a pair of left and right steering clutches, a turn brake, a slow turn clutch, and a reverse clutch. The pair of left and right steering clutches respectively switch the left and right travelling apparatuses 2 to the stopping state, and steer the travelling machine body so that it travels in the left direction and the right direction. The turn brake brakes the travelling apparatus 2 on the inside of a turn, out of the left and right travelling apparatuses 2, so that the travelling machine body makes a pivot turn. The slow turn clutch reduces the driving speed of the travelling apparatus 2 on the inside of a turn, out of the left and right travelling apparatuses 2, to be slower than the driving speed of the travelling apparatus 2 on the outside of the turn, so that the travelling machine body makes a slow turn with a turning radius larger than the turning radius of a pivot turn. The reverse clutch makes the driving direction of the travelling apparatus 2 on the inside of a turn, out of the left and right travelling apparatuses 2, and the driving direction of the travelling apparatus 2 on the outside of the turn, to be opposite directions so that the travelling machine body makes a super pivot turn with a turning radius smaller than the turning radius of a pivot turn.

The following describes the speed-change power transmission apparatus 30.

As shown in FIGS. 3, 4, and 5, the speed-change power transmission apparatus 30 is located at a position that is below the operation unit 3 and that is closer to the front of the travelling machine body than the engine 7 is. Specifically, the speed-change power transmission apparatus 30 is located below a floor portion 3d of the operation unit 3. A power transmission case 35 provided for the speed-change power transmission apparatus 30 is supported by the travelling power transmission case 32, and the speed-change power transmission apparatus 30 is supported by the machine body frame 1, with the travelling power transmission apparatus 31 therebetween.

Figure 7:
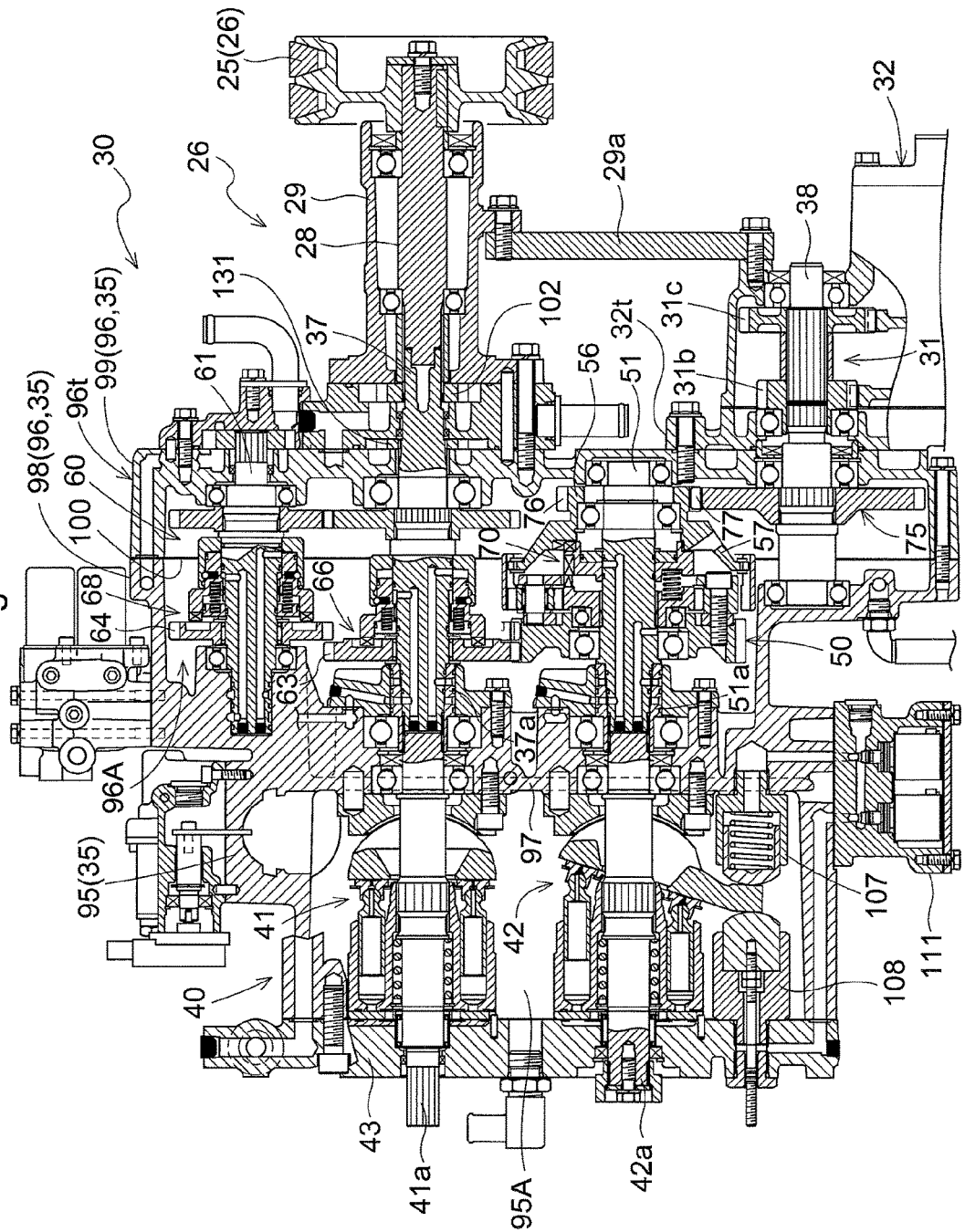
FIG. 7 is a developed view of a speed-change power transmission apparatus showing a vertical cross section.

FIG. 7 is a developed view of the speed-change power transmission apparatus 30 showing a vertical cross section. As shown in FIGS. 3, 4, 5, and 7, the speed-change power transmission apparatus 30 is provided with the power transmission case 35 whose lateral side portion is coupled to a side portion of an upper end portion of the travelling power transmission case 32 on the right side of the travelling machine body. The speed-change power transmission apparatus 30 includes: an input shaft 37 that is rotatably supported within the power transmission case 35 and extends in the lateral direction of the travelling machine body; a decelerating output shaft 38 that is located lower than the input shaft 37, is rotatably supported by the power transmission case 35 and the travelling power transmission case 32, and extends in the lateral direction of the travelling machine body; a continuously variable transmission unit 40 and a planetary power transmission unit 50 that are housed within the power transmission case 35; and a power transmission mechanism 60 that is provided to span the input shaft 37 and the planetary power transmission unit 50.

The input shaft 37 is coupled to the laterally outer side of the power transmission case 35 so as to be able to rotate integrally with a pulley shaft 28 that is provided coaxially with the input shaft 37. The travelling power transmission means 26 is configured with the pulley shaft 28. The pulley shaft 28 is rotatably supported within a cylindrical shaft case 29 by a bearing. The shaft case 29 extends inward from a lateral side portion of the power transmission case 35 along the lateral direction of the travelling machine body. The extended end portion of the shaft case 29 is supported by the travelling power transmission case 32, with a coupling rod 29a therebetween.

As shown in FIG. 7, the continuously variable transmission unit 40 includes: a hydraulic pump 41 that has a pump shaft 41a that is located coaxially with the input shaft 37, and a hydraulic motor 42 that is located below the hydraulic pump 41 and has a motor shaft 42a extending in the lateral direction of the travelling machine body. The pump shaft 41a and the motor shaft 42a are rotatably supported by a port block 43 and the power transmission case 35. The port block 43 is located opposite the planetary power transmission unit 50 with respect to the continuously variable transmission unit 40. The port block 43 is attached to an end portion of the power transmission case 35 on the continuously variable transmission unit 40 side. The pump shaft 41a and the input shaft 37 are coupled to each other with a coupling member 37a (see FIG. 8) so as to be able to rotate integrally with each other. The coupling member 37a is fitted onto the pump shaft 41a and the input shaft 37 from the outside, and is coupled to the pump shaft 41a and the input shaft 37 so as to rotate integrally with them due to a spline structure. The hydraulic pump 41 is configured with an axial plunger type and variable capacity type hydraulic pump. The hydraulic motor 42 is configured with an axial plunger type and variable capacity type hydraulic motor. The hydraulic pump 41 and the hydraulic motor 42 are connected by a drive circuit 44 (see FIG. 15) formed in the port block 43. The hydraulic pump 41 serves as a so-called main transmission apparatus, and the hydraulic motor 42 serves as a so-called sub transmission apparatus.

A hydraulic static continuously variable transmission unit is configured with the continuously variable transmission unit 40 so as to input the drive force, transmitted from the engine 7 to the input shaft 37, to the pump shaft 41a, convert the input drive force into a drive force in the forward rotation direction and a drive force in the reverse rotation direction, steplessly change the rotation speeds of the drive forces in the forward rotation direction and the reverse rotation direction, and output the drive forces from the motor shaft 42a. A continuously variable output shaft of the continuously variable transmission unit 40 is configured with the motor shaft 42a. In the following description, the motor shaft 42a is referred to as the continuously variable output shaft 42a.

Specifically, the continuously variable transmission unit 40 is switched to the neutral state, the forward drive state, or the reverse drive state upon an operation being performed to change the angle of a swashplate of the hydraulic pump 41. Upon being switched to the neutral state, the continuously variable transmission unit 40 stops the continuously variable output shaft 42a. Upon being switched to the forward drive state, the continuously variable transmission unit 40 drives the continuously variable output shaft 42a in the forward rotation direction, and steplessly changes the forward rotation speed of the continuously variable output shaft 42a upon an operation being performed to change the angle of the swashplate. Upon being switched to the reverse drive state, the continuously variable transmission unit 40 drives the continuously variable output shaft 42a in the reverse rotation direction, and steplessly changes the reverse rotation speed of the continuously variable output shaft 42a upon an operation being performed to change the angle of the swashplate.

Figure 8:
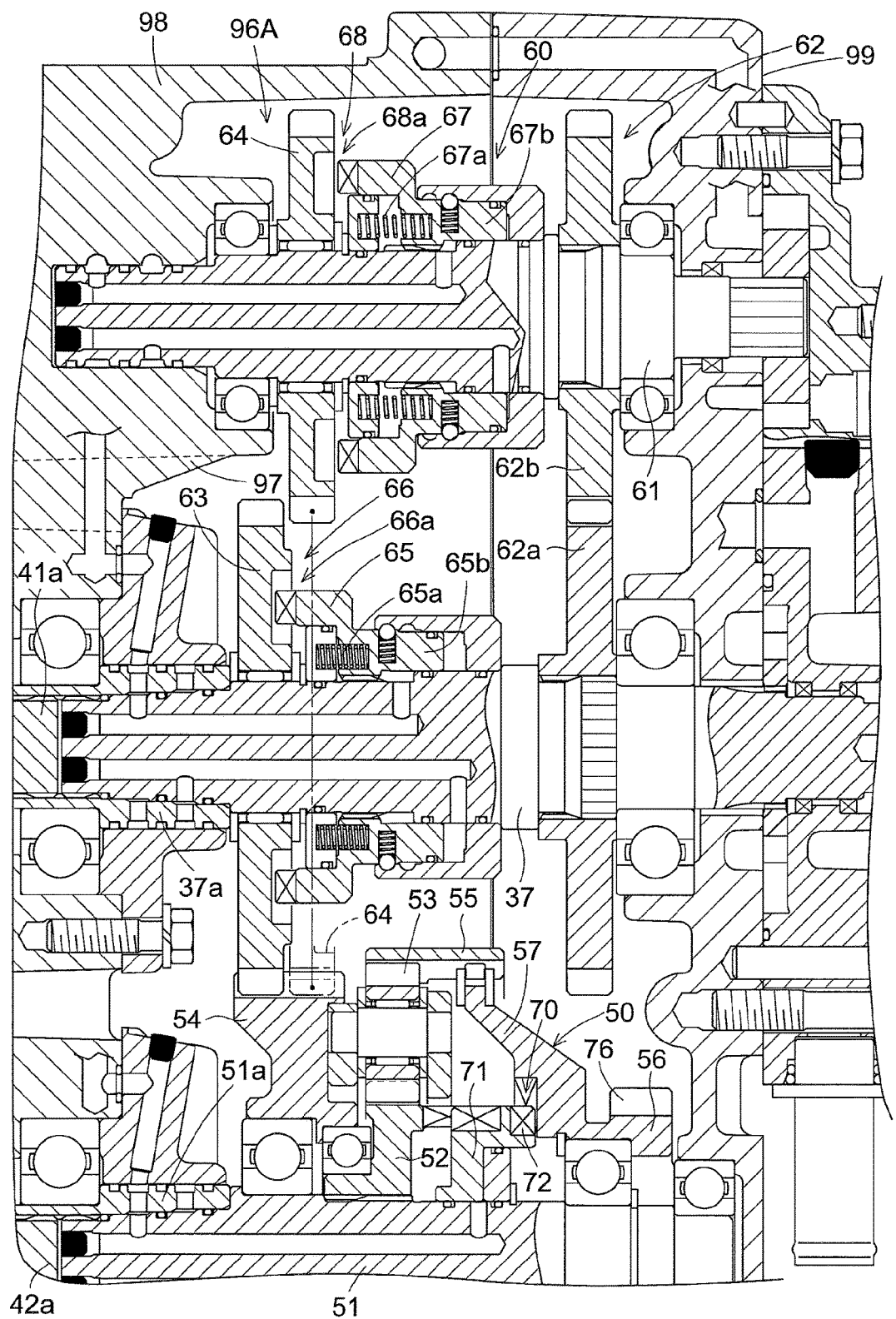
FIG. 8 is a cross-sectional view showing a power transmission mechanism.
Figure 9:
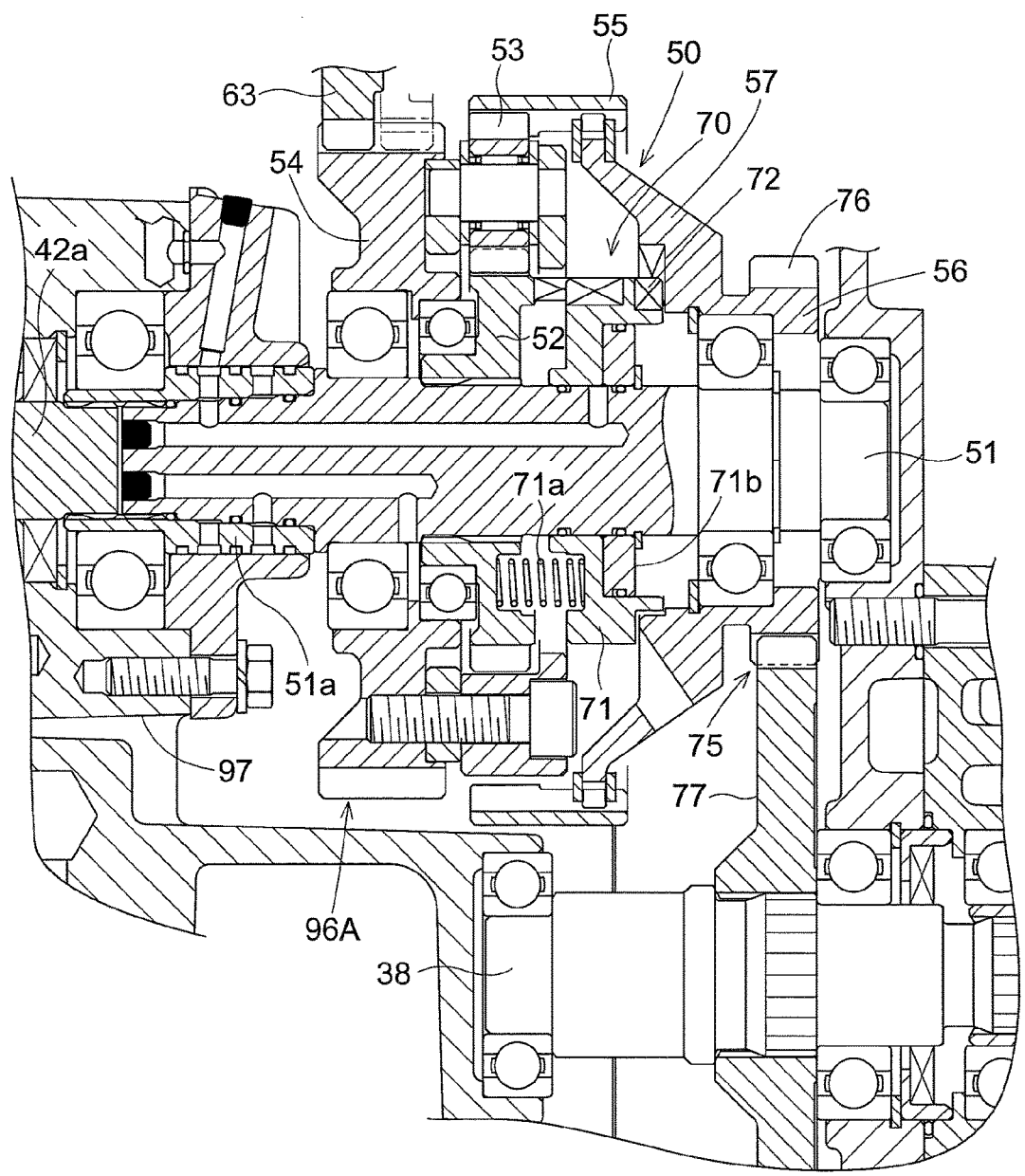
FIG. 9 is a cross-sectional view showing a planetary power transmission unit and a decelerating output shaft.

As shown in FIGS. 8 and 9, the planetary power transmission unit 50 includes: a rotation support shaft 51 that is located coaxially with the continuously variable output shaft 42a and is rotatably supported by the power transmission case 35; a sun gear 52 that is supported by the rotation support shaft 51 so as to rotate integrally with the rotation support shaft 51; a plurality of planetary gears 53 that engage with the sun gear 52: a carrier 54 that rotatably supports each of the planetary gears 53, and is supported by the rotation support shaft 51 so as to be rotatable relative to the rotation support shaft 51; a ring gear 55 having inner teeth that engage with the planetary gears 53; and a gear-shaped planetary output shaft 56 that is located opposite the carrier 54 with respect to the sun gear 52 and that is supported by the rotation support shaft 51 so as to be rotatable relative to the rotation support shaft 51.

The rotation support shaft 51 is coupled to the continuously variable output shaft 42a by a coupling member 51a so as to rotate integrally with the continuously variable output shaft 42a. The coupling member 51a is fitted onto the rotation support shaft 51 and the continuously variable output shaft 42a from the outside, and is coupled to the rotation support shaft 51 and the continuously variable output shaft 42a so as to rotate integrally with them due to a spline structure.

The planetary output shaft 56 and the ring gear 55 are coupled to each other by a ring-shaped interlocked member 57 so that they rotate integrally with each other. A toothed portion provided on the outer circumferential surface of the interlocked member 57 engages with the inner teeth of the ring gear 55, and since the interlocked member 57 and the planetary output shaft 56 are formed integrally with each other, the interlocked member 57 couples the ring gear 55 and the planetary output shaft 56 to each other such that they rotate integrally with each other.

A switching clutch 70 having a clutch body 71 is provided to span the planetary output shaft 56 and the sun gear 52. The clutch body 71 is slidably supported by the rotation support shaft 51. Upon an operation being performed to slide the clutch body 71 toward the interlocked member 57, a clutch main body 72 provided to span the clutch body 71 and the interlocked member 57 is turned on, and the switching clutch 70 is switched to the ON state. Upon an operation being performed to slide the clutch body 71 toward the sun gear 52, the clutch main body 72 is turned off, and the switching clutch 70 is switched to the OFF state. The clutch main body 72 is configured as an engaging clutch so as to include: output shaft side engaging teeth provided on the interlocked member 57; and engaging teeth provided on the clutch body 71 and configured to be engageable with the output shaft side engaging teeth.

The clutch body 71 is provided with coupling teeth that slidably engage with the coupling teeth provided on the side portion of the sun gear 52. The clutch body 71 is configured to be operated to slide such that the coupling teeth of the clutch body 71 are slid against the coupling teeth of the sun gear 52. A configuration is adopted in which, regardless of whether the clutch body 71 switches the switching clutch 70 to the ON state or the OFF state, engagement between the coupling teeth of the clutch body 71 and the coupling teeth of the sun gear 52 is maintained and the clutch body 71 is maintained in the state of being coupled to the sun gear 52 so as to rotate integrally with the sun gear 52.

Therefore, upon an operation being performed to switch the switching clutch 70 to the ON state, the switching clutch 70 operates the rotation support shaft 51, the sun gear 52, the planetary gears 53, and the ring gear 55 so that they rotate integrally with each other, disables the planetary power transmission unit 50 from performing a speed change action, and makes it possible to transmit the output from the continuously variable output shaft 42a of the continuously variable transmission unit 40 to the planetary output shaft 56 without being subjected to speed change.

Upon an operation being performed to switch the switching clutch 70 to the OFF state, the switching clutch 70 cancels the integrated rotation of the rotation support shaft 51, the sun gear 52, the planetary gears 53, and the ring gear 55, and enables the planetary power transmission unit 50 to perform a speed change action.

As shown in FIGS. 7 and 8, the power transmission mechanism 60 includes: a relay shaft 61 that is rotatably supported within the power transmission case 35 and extends in the lateral direction of the travelling machine body, a power transmission unit 62 by which the input shaft 37 and the relay shaft 61 are interlocked with each other; a forward power transmission gear 63 that is in the state of being engaged and interlocked with the toothed portion provided on the carrier 54 and that is supported by the input shaft 37 so as to be rotatable relative to the input shaft 37; and a reverse power transmission gear 64 that is in the state of being engaged and interlocked with the toothed portion of the carrier 54 and that is supported by the relay shaft 61 so as to be rotatable relative to the relay shaft 61.

The power transmission unit 62 includes: an input shaft gear 62a that is supported by the input shaft 37 so as to rotate integrally with the input shaft 37; and a relay shaft gear 62b that engages with the input shaft gear 62a and that is supported by the relay shaft 61 so as to rotate integrally with the relay shaft 61.

A forward clutch 66 that includes a forward clutch body 65 is provided so as to span the forward power transmission gear 63 and the input shaft 37. The forward clutch body 65 is slidably supported by a spline portion provided in the input shaft 37, so as to rotate integrally with the spline portion. Upon an operation being performed to slide the forward clutch body 65 toward the forward power transmission gear 63, a clutch main body 66a provided to span the forward clutch body 65 and the forward power transmission gear 63 is operated to be turned on, and the forward clutch 66 is operated to switch to the ON state. Upon an operation being performed to slide the forward clutch body 65 away from the forward power transmission gear 63, the clutch main body 66a is operated to be turned off, and the forward clutch 66 is operated to switch to the OFF state. The clutch main body 66a is configured as an engaging clutch so as to include: engaging teeth provided on a side portion of the forward power transmission gear 63; and engaging teeth provided on the forward clutch body 65 and configured to be engageable with the aforementioned engaging teeth.

Upon an operation being performed to switch the forward clutch 66 to the ON state, the forward clutch 66 transmits the drive force of the input shaft 37 to the forward power transmission gear 63 via the forward clutch body 65 and the clutch main body 66a, and further transmits the drive force from the forward power transmission gear 63 to the carrier 54. Upon an operation being performed to switch the forward clutch 66 to the OFF state, the forward clutch 66 enables the forward power transmission gear 63 and the input shaft 37 to rotate relative to each other, and terminates the power transmission from the input shaft 37 to the carrier 54.

A reverse clutch 68 that includes a reverse clutch body 67 is provided so as to span the reverse power transmission gear 64 and the relay shaft 61. The reverse clutch body 67 is slidably supported by a spline portion provided in the relay shaft 61, so as to rotate integrally with the spline portion. Upon an operation being performed to slide the reverse clutch body 67 toward the reverse power transmission gear 64, a clutch main body 68a provided to span the reverse clutch body 67 and the reverse power transmission gear 64 is operated to be turned on, and the reverse clutch 68 is operated to switch to the ON state. Upon an operation being performed to slide the reverse clutch body 67 away from the reverse power transmission gear 64, the clutch main body 68a is operated to be turned off, and the reverse clutch 68 is operated to switch to the OFF state. The clutch main body 68a is configured as an engaging clutch so as to include: engaging teeth provided on a side portion of the reverse power transmission gear 64; and engaging teeth provided on the reverse clutch body 67 and configured to be engageable with the aforementioned engaging teeth.

Upon an operation being performed to switch the reverse clutch 68 to the ON state, the reverse clutch 68 transmits the drive force of the input shaft 37 to the reverse power transmission gear 64 via the power transmission unit 62, the reverse clutch body 67, and the clutch main body 68a, and further transmits the drive force from the reverse power transmission gear 64 to the carrier 54. Upon an operation being performed to switch the reverse clutch 68 to the OFF state, the reverse clutch 68 enables the reverse power transmission gear 64 and the relay shaft 61 to rotate relative to each other, and terminates the power transmission from the input shaft 37 to the carrier 54.

Thus, upon an operation being performed to switch the forward clutch 66 to the ON state and to switch the reverse clutch 68 to the OFF state, the power transmission mechanism 60 transmits the drive force of the input shaft 37 to the carrier 54 as positive rotation force without the relay shaft 61 intervening therebetween.

Upon an operation being performed to switch the forward clutch 66 to the OFF state and to switch the reverse clutch 68 to the ON state, the power transmission mechanism 60 transmits the drive force of the input shaft 37 to the carrier 54 via the relay shaft 61 as reverse rotation force.

Upon an operation being performed to switch the forward clutch 66 and the reverse clutch 68 to the OFF state, the power transmission mechanism 60 terminates the power transmission from the input shaft 37 to the carrier 54.

As shown in FIG. 7, within the power transmission case 35, the decelerating output shaft 38 is interlocked with the planetary output shaft 56 via a decelerating power transmission mechanism 75. Within the travelling power transmission case 32, the decelerating output shaft 38 is interlocked with a pair of input gears 31b and 31c provided in the travelling power transmission apparatus 31. The decelerating power transmission mechanism 75 includes: a small-diameter gear 76 that is provided on the planetary output shaft 56 so as to rotate integrally with the planetary output shaft 56; and a large-diameter gear 77 that engages with the small-diameter gear 76 and is provided on the decelerating output shaft 38 so as to rotate integrally with the decelerating output shaft 38.

In both the case where only the continuously variable transmission unit 40 out of the continuously variable transmission unit 40 and the planetary power transmission unit 50 performs a speed change action and the drive force of a continuously variable output shaft 40a is output from the planetary output shaft 56, and the case where both the continuously variable transmission unit 40 and the planetary power transmission unit 50 perform a speed change action and the combined drive force is output from the planetary output shaft 56, the decelerating output shaft 38 decelerates the drive force from the planetary output shaft 56 by using the effect of the decelerating power transmission mechanism 75, and then transmits the drive force to the input gears 31b and 31c of the travelling power transmission apparatus 31.

Therefore, the speed-change power transmission apparatus 30: inputs the drive force from the engine 7 to the input shaft 37, subjects the drive force from the engine 7, which has been input to the input shaft 37, to speed change using only the continuously variable transmission unit 40 out of the continuously variable transmission unit 40 and the planetary power transmission unit 50, decelerates the drive force, which has been subjected to speed change, by transmitting the drive force from the continuously variable output shaft 42a to the decelerating power transmission mechanism 75 via the planetary output shaft 56, and then outputs the drive force from the decelerating output shaft 38 to the travelling power transmission apparatus 31; or subjects the drive force from the engine 7, which has been input to the input shaft 37, to speed change using the continuously variable transmission unit 40, combines the drive force, which has been subjected to speed change, with the drive force from the engine 7, which has been input to the input shaft 37, using the planetary power transmission unit 50, decelerates the combined drive force by transmitting the drive force from the planetary output shaft 56 to the decelerating power transmission mechanism 75, and then outputs the drive force from the decelerating output shaft 38 to the travelling power transmission apparatus 31.

Specifically, FIG. 17 is an illustration showing a relationship among the respective operation states of the forward clutch 66, the reverse clutch 68, and the switching clutch 70, the drive mode of the speed-change power transmission apparatus 30, the speed-change state of the continuously variable transmission unit 40, the rotation direction of the decelerating output shaft 38, and the rotation speed of the decelerating output shaft 38.

"F" shown in FIG. 17 indicates the forward power transmission state of the continuously variable transmission unit 40, and "R" indicates the reverse power transmission state of the continuously variable transmission unit 40. "OFF" shown in FIG. 17 indicates the OFF state of the forward clutch 66, the reverse clutch 68, and the switching clutch 70, and "ON" indicates the ON state of the forward clutch 66, the reverse clutch 68, and the switching clutch 70. "FORWARD ROTATION" shown in FIG. 17 indicates the forward rotation direction of the decelerating output shaft 38, and "REVERSE ROTATION" indicates the reverse rotation direction of the decelerating output shaft 38. "FL" shown in FIG. 17 indicates that the decelerating output shaft 38 is driven at a speed within a low-speed rotation range of forward rotation, "FM" indicates that the decelerating output shaft 38 is driven at a speed within a mid-speed rotation range of forward rotation, and "FH" indicates that the decelerating output shaft 38 is driven at a speed within a high-speed rotation range of forward rotation. "RL" shown in FIG. 17 indicates that the decelerating output shaft 38 is driven at a speed within a low-speed rotation range of reverse rotation, "RM" indicates that the decelerating output shaft 38 is driven at a speed within a mid-speed rotation range of reverse rotation, and "RH" indicates that the decelerating output shaft 38 is driven at a speed within a high-speed rotation range of reverse rotation.

As shown in FIG. 17, upon the forward clutch 66 and the reverse clutch 68 being switched to the OFF state and the switching clutch 70 being switched to the ON state, the speed-change power transmission apparatus 30 enters a first mode (hereinafter referred to as "HST mode"). In the HST mode, the speed-change power transmission apparatus 30 causes the continuously variable transmission unit 40 to perform a speed change action, but does not cause the planetary power transmission unit 50 to perform a speed change action. The speed-change power transmission apparatus 30 decelerates the drive force of the input shaft 37, which has been input to the continuously variable transmission unit 40 and has been subjected to speed change, by transmitting the drive force from the continuously variable output shaft 42*a* to the decelerating power transmission mechanism 75 via the planetary output shaft 56, and drives the decelerating output shaft 38 with the drive force thus decelerated.

As shown in FIG. 17, upon either the forward clutch 66 or the reverse clutch 68 being switched to the ON state and the switching clutch 70 being switched to the OFF state, the speed-change power transmission apparatus 30 enters a second mode (hereinafter referred to as "HMT mode"). In the HMT mode, the speed-change power transmission apparatus 30 causes the continuously variable transmission unit 40 and the planetary power transmission unit 50 to perform a speed change action, combines the drive force that has been subjected to speed change by inputting the drive force of the input shaft 37 to the continuously variable transmission unit 40, and the drive force of the input shaft 37, using the planetary power transmission unit 50, decelerates the combined drive force by transmitting the drive force from the planetary output shaft 56 to the decelerating power transmission mechanism 75, and drives the decelerating output shaft 38 with the combined drive force thus decelerated.

Figure 15:
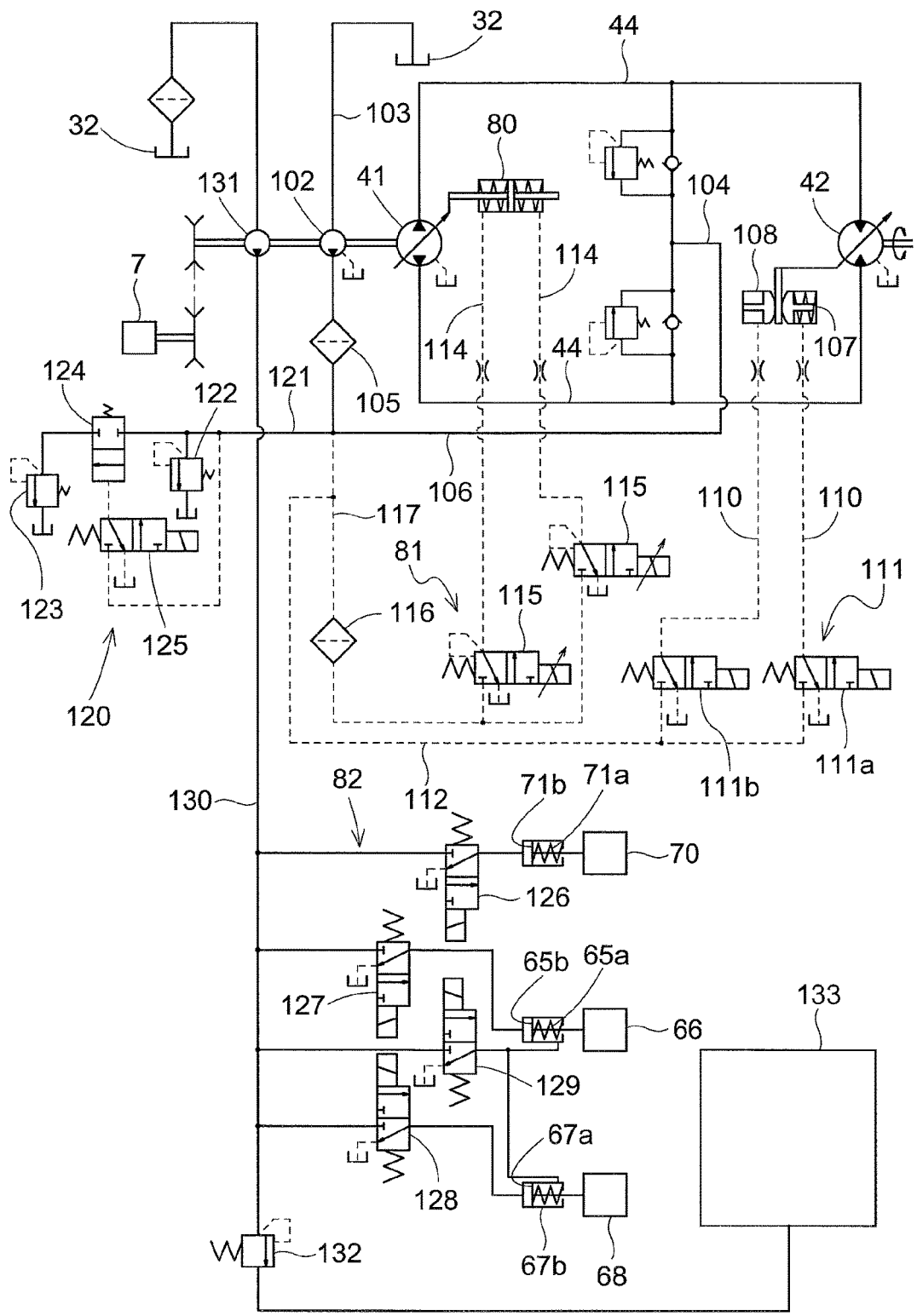
FIG. 15 is a diagram showing a hydraulic circuit for performing a speed change operation with the speed-change power transmission apparatus.

As shown in FIG. 15, a configuration is adopted in which the angle of the swashplate of the hydraulic pump 41 is operated to be changed by a servo cylinder 80. As shown in FIGS. 9 and 15, a configuration is adopted in which an operation to switch the switching clutch 70 is performed by a spring 71*a* that biases the clutch body 71 toward the on-side of the clutch main body 72, and a hydraulic piston 71*b* that operates to move the clutch body 71 toward the off-side of the clutch main body 72. As shown in FIGS. 8 and 15, a configuration is adopted in which an operation to switch the forward clutch 66 is performed by a spring 65*a* that biases the forward clutch body 65 toward the off-side of the clutch main body 66*a*, and a hydraulic piston 65*b* that operates to move the forward clutch body 65 toward the on-side of the clutch main body 66*a*. As shown in FIGS. 8 and 15, a configuration is adopted in which an operation to switch the reverse clutch 68 is performed by the spring 67*a* that biases the reverse clutch body 67 toward the off-side of the clutch main body 68*a*, and a hydraulic piston 67*b* that operates to move the reverse clutch body 67 toward the on-side of the clutch main body 68*a*.

Figure 16:
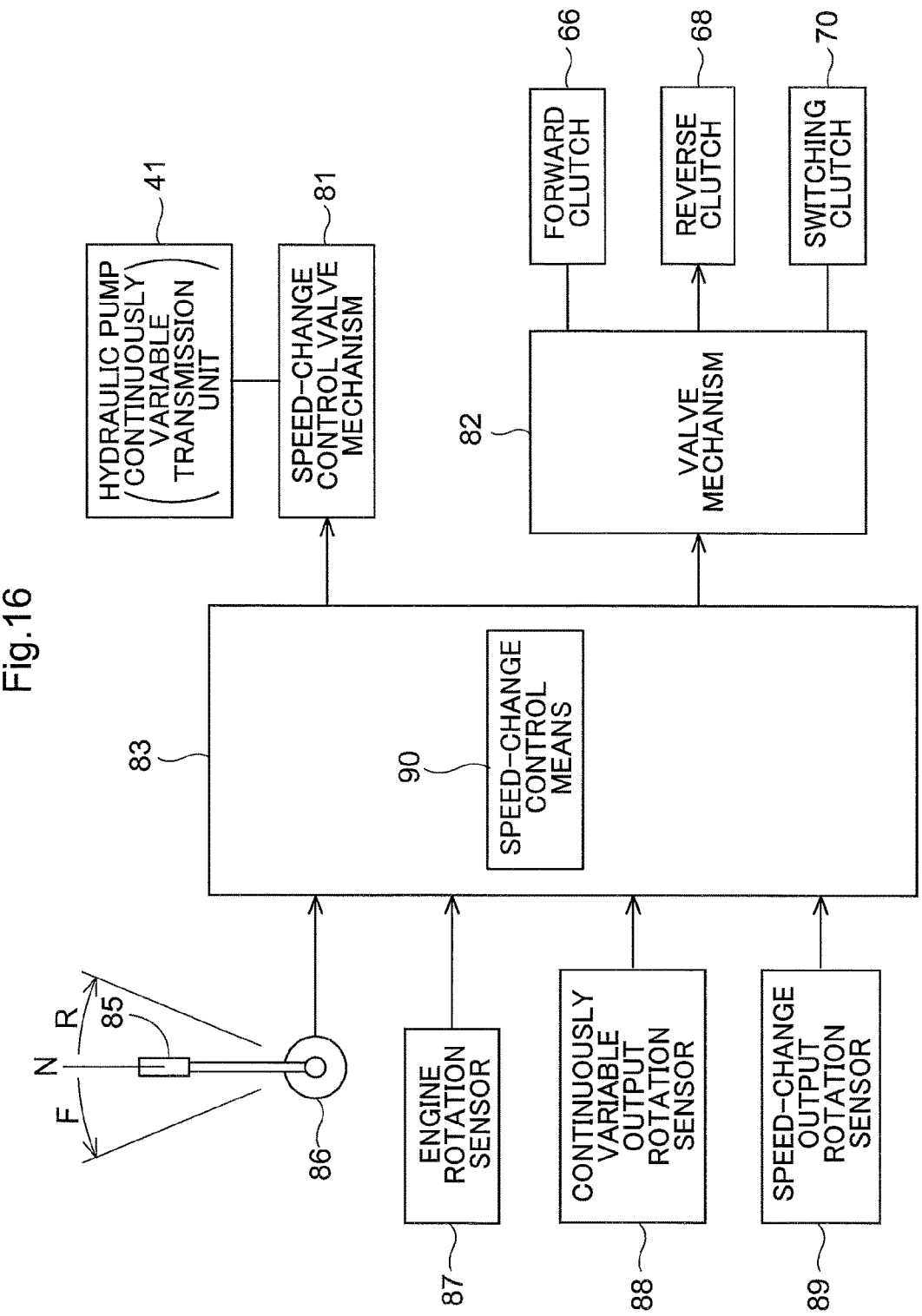
FIG. 16 is a block diagram showing an operation apparatus for the speed-change power transmission apparatus.

As shown in FIG. 16, a speed-change control valve mechanism 81 that performs a speed change operation with the hydraulic pump 41 by controlling the servo cylinder 80, and a valve mechanism 82 that switches the drive mode of the speed-change power transmission apparatus 30 to the HST mode and the HMT mode by operating the respective hydraulic pistons 65*b*, 67*b*, and 71*b* of the forward clutch 66, the reverse clutch 68, and the switching clutch 70, and switches the output rotation direction of the speed-change power transmission apparatus 30 to the forward rotation direction and the reverse rotation direction, are linked with a control apparatus 83.

An operation position sensor 86 that detects the operation position of a main shift lever 85, an engine rotation sensor 87 that detects the output speed of the engine 7, a continuously variable output rotation sensor 88 that detects the output speed of the continuously variable transmission unit 40, and a speed-change output rotation sensor 89 that detects the output speed of the speed-change power transmission apparatus 30 are linked with the control apparatus 83. The control apparatus 83 is configured with a microcomputer, and a speed-change control means 90 is provided in the control apparatus 83. The speed-change control means 90 is configured to control the speed-change control valve mechanism 81 and the valve mechanism 82 based on detection information from the operation position sensor 86, the engine rotation sensor 87, the continuously variable output rotation sensor 88, and the speed-change output rotation sensor 89 such that the drive mode of the speed-change power transmission apparatus 30, the rotation direction of the decelerating output shaft 38, and the rotation speed of the decelerating output shaft 38 respectively coincide with the drive mode, the rotation direction, and the rotation speed that correspond to the operation position of the main shift lever 85.

Therefore, upon the main shift lever 85 being operated, a speed change operation with the hydraulic pump 41, and switching operations with the forward clutch 66, the reverse clutch 68, and the switching clutch 70 are performed by the speed-change control means 90 as shown in FIG. 17, and thus it is possible to drive the decelerating output shaft 38 while changing its speed as shown in FIG. 18.

FIG. 18 is an illustration showing a relationship among the speed-change state of the continuously variable transmission unit 40, the rotation direction of the decelerating output shaft 38, and the rotation speed of the decelerating output shaft 38. The horizontal axis in FIG. 18 indicates the speed-change state of the continuously variable transmission unit 40, and the vertical axis indicates the rotation direction and the rotation speed of the decelerating output shaft 38. "n" in the horizontal axis indicates the neutral state of the continuously variable transmission unit 40, "−max" in the horizontal axis indicates the position of the maximum speed of the continuously variable transmission unit 40 in the reverse drive state, and "+max" in the horizontal axis indicates the position of the maximum speed of the continuously variable transmission unit 40 in the forward drive state. A solid line RL shown in FIG. 18 indicates the output from the decelerating output shaft 38 driven in the HST mode with reverse rotation, and solid lines RM and RH indicate the output from the decelerating output shaft 38 driven in the HMT mode with reverse rotation. A solid line FL shown in FIG. 18 indicates the output from the decelerating output shaft 38 driven in the HST mode with forward rotation, and solid lines FM and FH indicate the output from the decelerating output shaft 38 driven in the HMT mode with forward rotation.

Upon the main shift lever 85 being operated to the neutral position "N" (see FIG. 16), the continuously variable transmission unit 40 is operated to be shifted to the mid-state "n", the forward clutch 66 and the reverse clutch 68 are operated to enter the OFF state, and the decelerating output shaft 38 is stopped.

Upon the main shift lever 85 being shifted from the neutral position "N" to the forward range "F" (see FIG. 16), the forward clutch 66 and the reverse clutch 68 are operated to enter the OFF state, the switching clutch 70 is operated to enter the ON state, and the speed-change power transmission apparatus 30 enters the HST mode (the first mode). If the main shift lever 85 in the forward range "F" is shifted from the neutral position "N" toward the forward maximum speed position, the forward clutch 66 and the reverse clutch 68 are maintained in the OFF state, the switching clutch 70 is maintained in the ON state, and the decelerating output shaft 38 is driven in the forward rotation direction in the HST mode, until the operation position of the main shift lever 85 reaches a first intermediate position in the forward range "F". Then, as indicated by the solid line FL, the continuously variable transmission unit 40 is shifted up toward the maximum speed position "+max" in the forward drive state, and the forward rotation speed of the decelerating output shaft 38 steplessly increases. Upon the operation position of the main shift lever 85 reaching the first intermediate position in the forward range "F", the continuously variable transmission unit 40 is operated to be shifted to the maximum speed position "+max" in the forward drive state, and the forward rotation speed of the decelerating output shaft 38 reaches "FV1".

Upon the operation position of the main shift lever 85 reaching the first intermediate position in the forward range "F", the forward clutch 66 is operated to switch to the ON state, the switching clutch 70 is operated to switch to the OFF state, and the speed-change power transmission apparatus 30 is switched from the HST mode to the HMT mode (the second mode). In order to prevent a switching shock from occurring, the switching of the forward clutch 66 to the ON state is performed when the respective rotation speeds of the forward clutch body 65 and the forward power transmission gear 63 coincide with each other.

If the main shift lever 85 is shifted from the first intermediate position in the forward range "F" toward the forward maximum speed position, the forward clutch 66 is maintained in the ON state, the reverse clutch 68 is maintained in the OFF state, the switching clutch 70 is maintained in the OFF state, and the decelerating output shaft 38 is driven in the forward rotation direction in the HMT mode. Then, as indicated by the solid line FM, the continuously variable transmission unit 40 in the forward drive state is shifted down toward the neutral state "n", and the forward rotation speed of the decelerating output shaft 38 steplessly increases. Upon the operation position of the main shift lever 85 reaching a second intermediate position in the forward range "F", the continuously variable transmission unit 40 is operated to be shifted from the forward drive state to the reverse drive state.

If the main shift lever 85 is shifted from the second intermediate position in the forward range "F" toward the forward maximum speed position, the forward clutch 66 is maintained in the ON state, the reverse clutch 68 is maintained in the OFF state, the switching clutch 70 is maintained in the OFF state, and the decelerating output shaft 38 is driven in the HMT mode. Then, as indicated by the solid line FH, the continuously variable transmission unit 40 is shifted down toward the maximum speed position "−max" in the reverse drive state, and the forward rotation speed of the decelerating output shaft 38 steplessly increases further. Upon the operation position of the main shift lever 85 reaching the forward maximum speed position, the continuously variable transmission unit 40 is operated to be shifted to the maximum speed position "−max" in the reverse drive state, and the forward rotation speed of the decelerating output shaft 38 reaches the maximum speed "FV2".

Upon the main shift lever 85 being shifted from the neutral position "N" to the reverse range "R" (see FIG. 16), the forward clutch 66 and the reverse clutch 68 are operated to enter the OFF state, the switching clutch 70 is operated to enter the ON state, and the speed-change power transmission apparatus 30 enters the HST mode. If the main shift lever 85 in the reverse range "R" is shifted from the neutral position "N" toward the reverse maximum speed position, the forward clutch 66 and the reverse clutch 68 are maintained in the OFF state, the switching clutch 70 is maintained in the ON state, and the decelerating output shaft 38 is driven in the reverse rotation direction in the HST mode, until the operation position of the main shift lever 85 reaches a first intermediate position in the reverse range "R". Then, as indicated by the solid line RL, the continuously variable transmission unit 40 is shifted down toward the maximum speed position "−max" in the reverse drive state, and the reverse rotation speed of the decelerating output shaft 38 steplessly increases. Upon the operation position of the main shift lever 85 reaching the first intermediate position in the reverse range "R", the continuously variable transmission unit 40 is operated to be shifted to the maximum speed position "−max" in the reverse drive state, and the reverse rotation speed of the decelerating output shaft 38 reaches "RV1".

Upon the operation position of the main shift lever 85 reaching the first intermediate position in the reverse range "R", the reverse clutch 68 is operated to switch to the ON state, the switching clutch 70 is operated to switch to the OFF state, and the speed-change power transmission apparatus 30 is switched from the HST mode to the HMT mode. In order to prevent a switching shock from occurring, the switching of the reverse clutch 68 to the ON state is performed when the respective rotation speeds of the reverse clutch body 67 and the reverse power transmission gear 64 coincide with each other.

If the main shift lever 85 is shifted from the first intermediate position in the reverse range "R" toward the reverse maximum speed position, the reverse clutch 68 is maintained in the ON state, the forward clutch 66 is maintained in the OFF state, the switching clutch 70 is maintained in the OFF state, and the decelerating output shaft 38 is driven in the reverse rotation direction in the HMT mode. Then, as indicated by the solid line RM, the continuously variable transmission unit 40 in the reverse drive state is shifted down toward the neutral state "n", and the reverse rotation speed of the decelerating output shaft 38 steplessly increases. Upon the operation position of the main shift lever 85 reaching a second intermediate position in the reverse range "R", the continuously variable transmission unit 40 is operated to be shifted from the reverse drive state to the forward drive state.

If the main shift lever 85 is shifted from the second intermediate position in the reverse range "R" toward the reverse maximum speed position, the reverse clutch 68 is maintained in the ON state, the forward clutch 66 is maintained in the OFF state, the switching clutch 70 is maintained in the OFF state, and the decelerating output shaft 38 is driven in the HMT mode. Then, as indicated by the solid line RH, the continuously variable transmission unit 40 is shifted up toward the maximum speed position "+max" in the forward drive state, and the reverse rotation speed of the decelerating output shaft 38 steplessly increases further. Upon the operation position of the main shift lever 85 reaching the reverse maximum speed position, the continuously variable transmission unit 40 is operated to be shifted to the maximum speed position "+max" in the forward drive state, and the reverse rotation speed of the decelerating output shaft 38 reaches the maximum speed "RV2".

Figure 11:
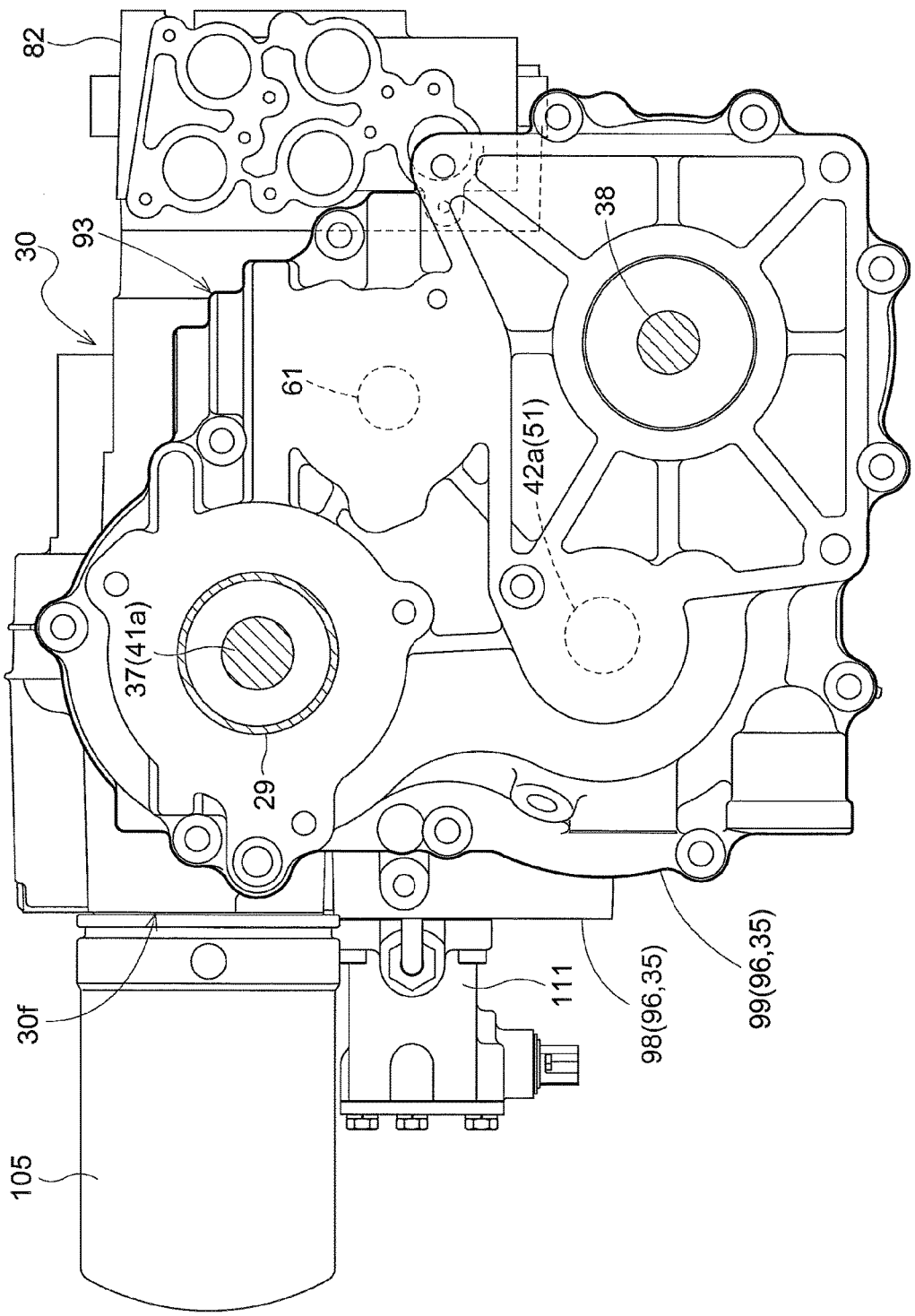
FIG. 11 is a left-side view showing a speed-change power transmission apparatus.
Figure 12:
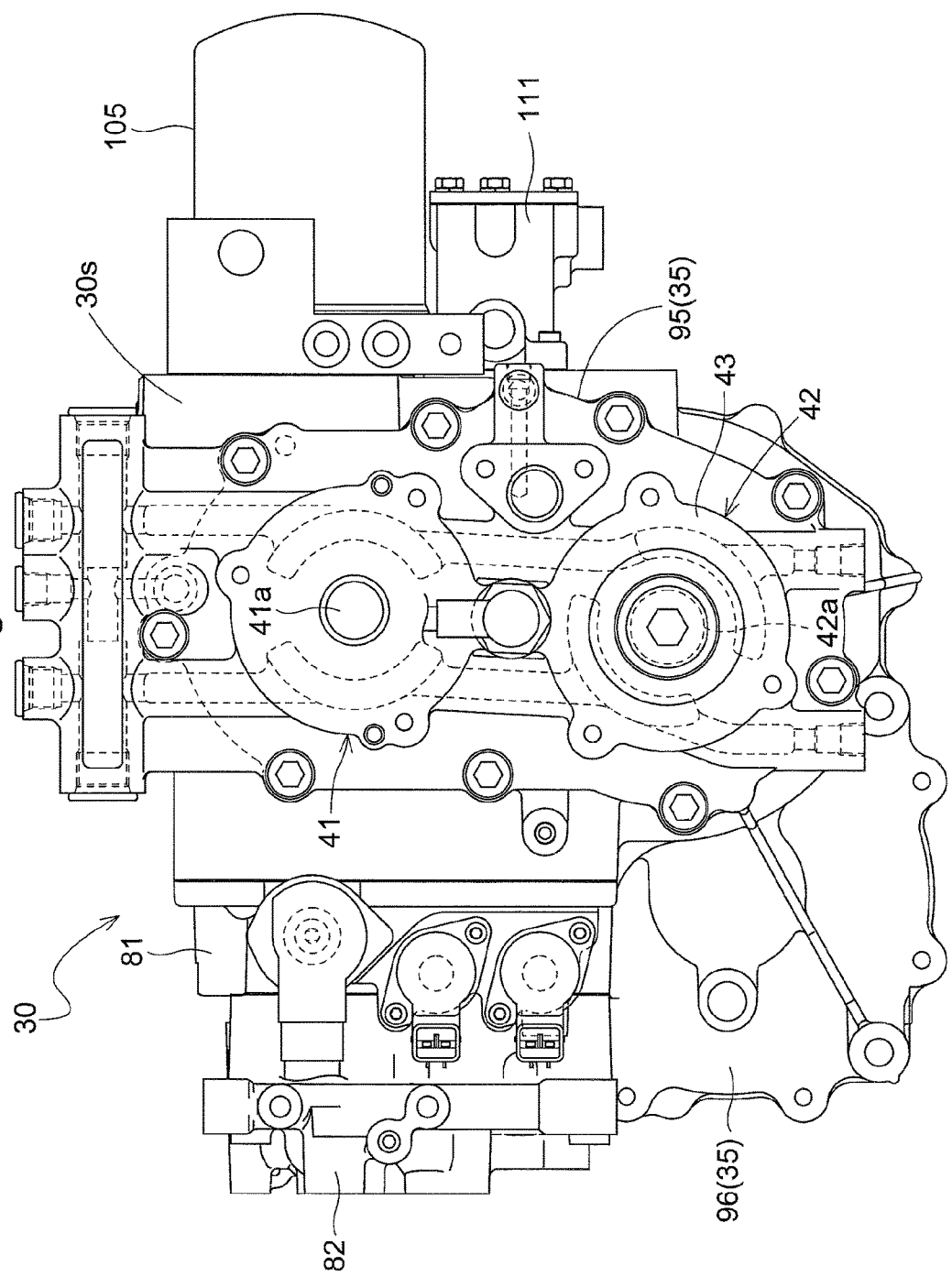
FIG. 12 is a right-side view showing the speed-change power transmission apparatus.
Figure 13:
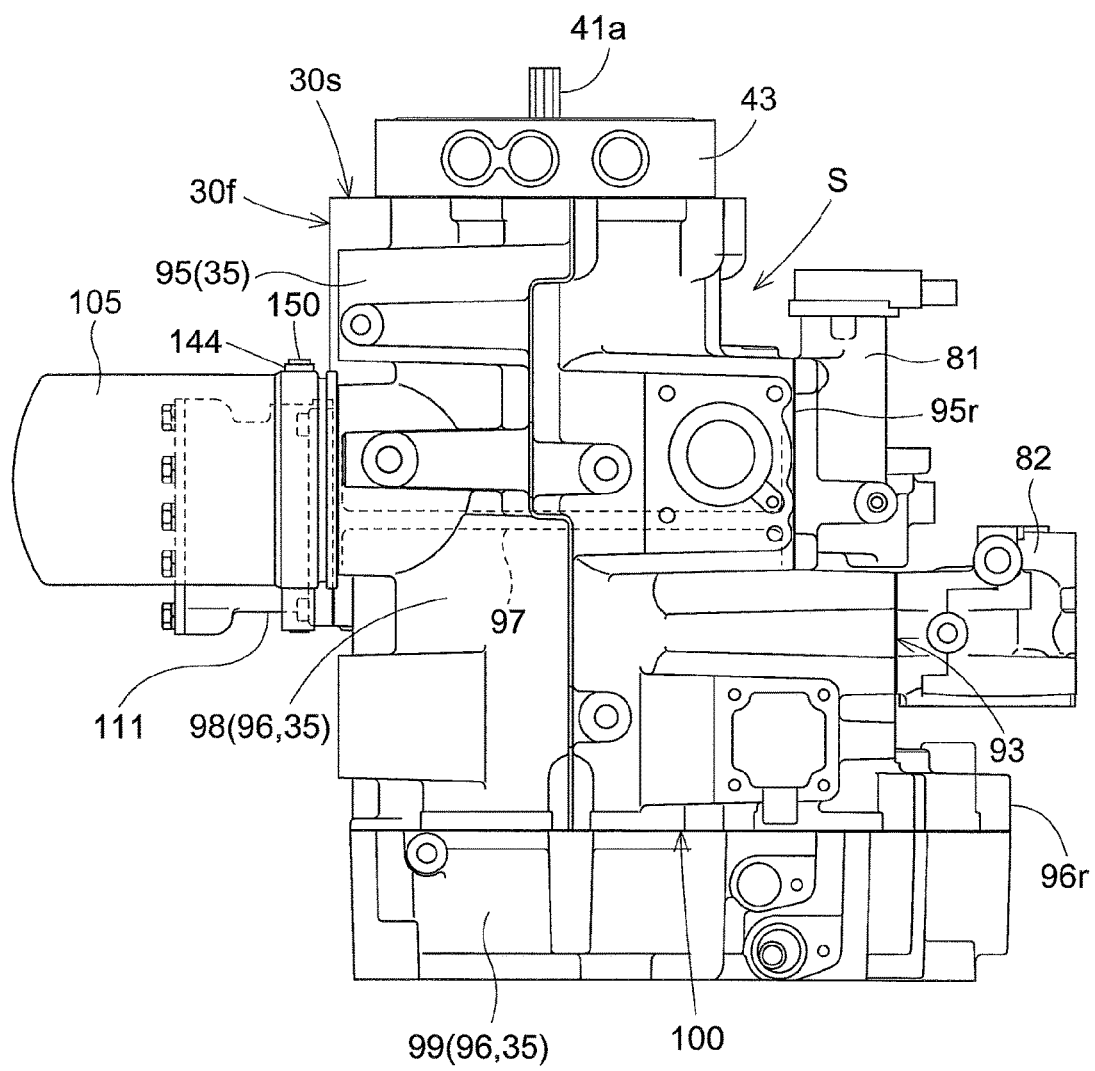
FIG. 13 is a plan view showing the speed-change power transmission apparatus.

FIG. 11 is a left-side view showing the speed-change power transmission apparatus 30. FIG. 12 is a right-side view showing the speed-change power transmission apparatus 30. FIG. 13 is a plan view showing the speed-change power transmission apparatus 30. As shown in FIGS. 11, 12, and 13, the input shaft 37, the relay shaft 61, and the continuously variable output shaft 42*a* are located higher than the decelerating output shaft 38. The relay shaft 61 is located between the input shaft 37 and the continuously variable output shaft 42*a* in the top-to-bottom direction of the travelling machine body, and the relay shaft 61 is located behind the input shaft 37 and the continuously variable output shaft 42*a* in the rear front direction of the travelling machine body. The input shaft 37 and the continuously variable output shaft 42*a* are arranged along the top-to-bottom direction of the travelling machine body. The relay shaft 61 is located slightly further in the forward direction than the decelerating output shaft 38.

In other words, a configuration is adopted in which the hydraulic pump 41 and the hydraulic motor 42 are arranged along the top-to-bottom direction of the travelling machine body in order to make it easy to form the drive circuit 44 or the like in the port block 43. A configuration is adopted in which the gap between the input shaft 37 and the output shaft 7*a* of the engine 7 is appropriate and the length of the travelling power transmission means 26 in the front-rear direction is not too long so that the power transmission by the travelling power transmission means 26 is reliable. A configuration is adopted in which the relay shaft 61 does not extend forward so that the length of the power transmission case 35 in the front-rear direction can be shortened.

As shown in FIGS. 7, 11, 12, and 13, the power transmission case 35 is formed such that a continuously variable transmission case portion 95 that houses the continuously variable transmission unit 40, and a planetary power transmission case portion 96 that houses the planetary power transmission unit 50 and the power transmission mechanism 60, are arranged along the lateral direction of the travelling machine body. Specifically, the continuously variable transmission unit 40 and the planetary power transmission unit 50 are arranged along the lateral direction of the travelling machine body and are housed within the power transmission case 35. Specifically, the continuously variable transmission unit 40 and the planetary power transmission unit 50 are housed within the power transmission case 35 side by side such that the continuously variable transmission unit 40 is located opposite the travelling power transmission apparatus 31 with respect to the planetary power transmission unit 50.

The continuously variable transmission case portion 95 is formed integrally with the planetary power transmission case portion 96. A continuously variable transmission compartment 95A in the continuously variable transmission case portion 95 that houses the continuously variable transmission unit 40 is fully or substantially fully filled with hydraulic oil, and a planetary power transmission compartment 96A in the planetary power transmission case portion 96 that houses the planetary power transmission unit 50 and the power transmission mechanism 60 is filled with lubricant oil whose oil surface is lower than the oil surface in the continuously variable transmission compartment 95A. Therefore, the continuously variable transmission compartment 95A and the planetary power transmission compartment 96A are separated from each other with a partition 97 provided within the power transmission case 35 in order to prevent the hydraulic oil in the continuously variable transmission compartment 95A from flowing out to the planetary power transmission compartment 96A. The continuously variable transmission case portion 95 and the planetary power transmission case portion 96 are formed by molding with an aluminium alloy material. The partition 97 is formed integrally with the power transmission case 35, and is manufactured with an aluminum alloy material.

The planetary power transmission case portion 96 includes: a first divisional planetary power transmission case portion 98 that is formed integrally with the continuously variable transmission case portion 95 and that is provided with the partition 97; and a second divisional planetary power transmission case portion 99 that is located opposite the continuously variable transmission case portion 95 with respect to the first divisional planetary power transmission case portion 98 and that is joined to the first divisional planetary power transmission case portion 98 by a joint surface 100. A configuration is adopted in which checking and assembly of the planetary power transmission unit 50 and the power transmission mechanism 60 is performed by dividing the planetary power transmission case portion 96 into the first divisional planetary power transmission case portion 98 and the second divisional planetary power transmission case portion 99 at the joint surface 100 as the division surface, and thus widely opening the inside of the planetary power transmission case portion 96.

A configuration is adopted in which checking and assembly of the continuously variable transmission unit 40 is performed by removing the port block 43 and opening the inside of the continuously variable transmission case portion 95. The port block 43 is manufactured with an iron material or the like so as to be provided with durability against the high pressure of the hydraulic oil applied to the drive circuit 44 that connects the hydraulic pump 41 and the hydraulic motor 42.

The input shaft 37 is coupled to the pulley shaft 28 with which the travelling power transmission means 26 is configured on a laterally outer side of the planetary power transmission case portion 96, and therefore the drive force from the engine 7 is input to the speed-change power transmission apparatus 30 from a laterally outer side of the side to which the travelling power transmission apparatus 31 in the planetary power transmission case portion 96 is coupled. Specifically, the travelling power transmission case 32 is disposed such that an upper end 32t is located lower than an upper end 96t of the planetary power transmission case portion 96, and the pulley shaft 28 is located higher than the travelling power transmission case 32. Specifically, the drive force from the engine 7 is input to the speed-change power transmission apparatus 30 from a part that is on a laterally outer side of the planetary power transmission case portion 96 and that is located higher than the travelling power transmission case 32.

As shown in FIGS. 12 and 13, the speed-change control valve mechanism 81 is disposed in a space S that has a cutout-like shape when seen from above the upper surface of the travelling machine body and is formed in the lateral end portion on the rear end side of the power transmission case 35. The space S is formed by providing the power transmission case 35 with a shape in which, when seen from above the travelling machine body, an end 95r of the continuously variable transmission case portion 95 on the rear side of the travelling machine body is located closer to the front of the travelling machine body than an end 96r of the planetary power transmission case portion 96 on the rear side of the travelling machine body is. The space S is formed such that the space between the speed-change power transmission apparatus 30 and the engine 7 is wide, and the engine 7 located behind the speed-change power transmission apparatus 30 does not obstruct the speed-change control valve mechanism 81 being disposed.

As shown in FIGS. 11, 12, and 13, the valve mechanism 82 is disposed on an upper portion of the power transmission case 35. Specifically, the valve mechanism 82 is disposed on an inclined part 93 of the upper portion of the power transmission case 35, where the height of the inclined part 93 decreases toward the rear side of the travelling machine body. The inclined part 93 is provided on the upper portion of the planetary power transmission case portion 96 of the power transmission case 35.

Specifically, the input shaft 37 is disposed higher than the relay shaft 61, the relay shaft 61 is disposed on the upper side within the planetary power transmission case portion 96, and thus the inclined part 93 is provided on the upper portion of the planetary power transmission case portion 96. Since the inclined part 93 is provided on the upper portion of the planetary power transmission case portion 96, an empty space is formed above the planetary power transmission case portion 96, and the empty space is utilized as a space for housing the valve mechanism 82 so that the valve mechanism 82 can be supported on the power transmission case 35 to achieve compactness.

The valve mechanism 82 is disposed on a part of the inclined part 93, the part being located close to the partition 97. Therefore, the valve mechanism 82 can be disposed close to the hydraulic oil path formed inside the partition 97 so as to connect the valve mechanism 82 and the respective hydraulic pistons 65b and 67b of the forward clutch 66 and the reverse clutch 68, and thus the length of the connection oil path that connects the hydraulic oil path and the valve mechanism 82 can be reduced.

As shown in FIG. 7, a drivable charge pump 102 is provided for the speed-change power transmission apparatus 30. Specifically, the charge pump 102 is housed in a part, to which the shaft case 29 is coupled, of the planetary power transmission case portion 96. The charge pump 102 is configured to be interlocked with the input shaft 37 and to be driven by the drive force from the engine 7 transmitted to the input shaft 37. The charge pump 102 is configured with a trochoid pump.

As shown in FIG. 15, a suction oil path 103 that extends from the suction side of the charge pump 102 is connected to the travelling power transmission case 32. The discharge side of the charge pump 102 and a supply oil path 104 of the continuously variable transmission unit 40 are connected via an oil supply path 106 provided with an oil filter 105. The charge pump 102 sucks the lubricant oil stored in the travelling power transmission case 32, removes foreign objects such as iron powder from the sucked lubricant oil with the oil filter 105, and then supplies the oil to the continuously variable transmission unit 40 as hydraulic oil.

Figure 10:
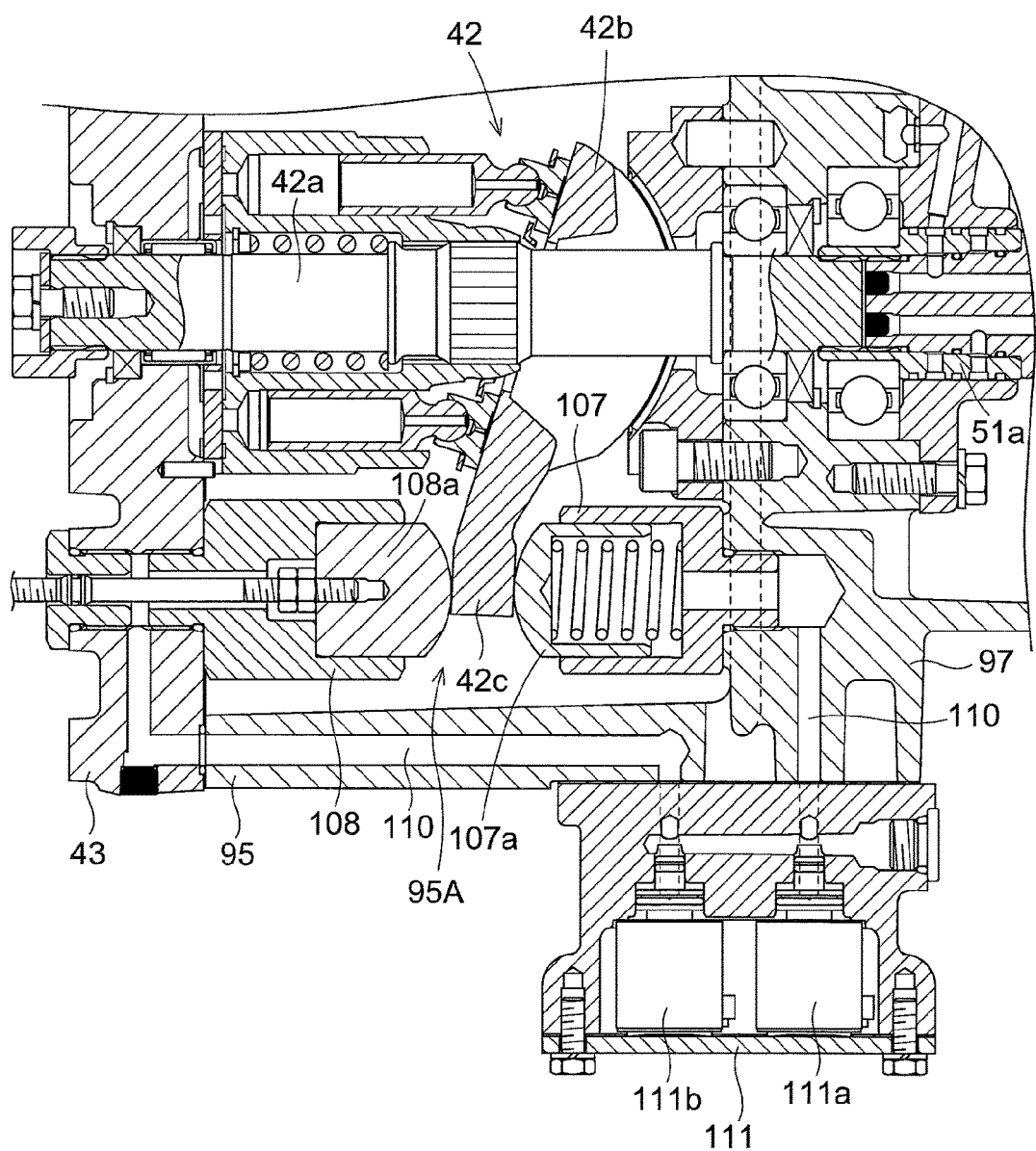
FIG. 10 is a lateral plan view showing a hydraulic motor.

As described above, the hydraulic motor 42 of the continuously variable transmission unit 40 is configured with a variable capacity type hydraulic motor. As shown in FIGS. 7 and 10, a configuration is adopted in which a swashplate 42b of the hydraulic motor 42 is operated to be inclined by a pair of hydraulic cylinders 107 and 108 housed within the continuously variable transmission case portion 95, based on operations of a sub shift lever not shown in the drawings, and a speed change operation with the hydraulic motor 42 is performed by the pair of hydraulic cylinders 107 and 108.

Specifically, the pair of hydraulic cylinders 107 and 108 are separately disposed on the left and right sides of the travelling machine body with respect to the swashplate 42b. The hydraulic cylinder 107 out of the pair of hydraulic cylinders 107 and 108 is configured to operate the swashplate 42b to incline toward the acceleration side by causing a piston 107a to act to press against an operation portion 42c of the swashplate 42b from one lateral direction of the travelling machine body. Thus, an accelerating hydraulic cylinder that operates to subject the hydraulic motor 42 to speed change to the acceleration side is configured with the hydraulic cylinder 107.

The other hydraulic cylinder, the hydraulic cylinder 108, out of the pair of hydraulic cylinders 107 and 108, is disposed to operate the swashplate 42b to incline toward the deceleration side by causing a piston 108a to act to press against the operation portion 42c of the swashplate 42b from the other lateral direction of the travelling machine body. Thus, a decelerating hydraulic cylinder that operates to shift the hydraulic motor 42 to the deceleration side is configured with the hydraulic cylinder 108.

A hydraulic circuit that operates the pair of hydraulic cylinders 107 and 108 (the accelerating hydraulic cylinder and the decelerating hydraulic cylinder) is configured as shown in FIG. 15.

A motor control valve mechanism 111 is connected to the pair of hydraulic cylinders 107 and 108 via a pair of hydraulic oil paths 110. The motor control valve mechanism 111 and a part of the oil supply path 106, the part being located downstream of the oil filter 105, is connected by a pilot oil path 112. The motor control valve mechanism 111 includes a pair of direction control valves 111a and 11b respectively connected to the pair of hydraulic cylinders 107 and 108.

The motor control valve mechanism 111 takes in the lubricant oil, which has been supplied to the oil supply path 106 by the charge pump 102 and from which foreign objects have been removed by the oil filter 105, via the pilot oil path 112. When operated to switch to the acceleration side, the motor control valve mechanism 111 supplies lubricant oil, which has been taken in from the oil supply path 106, to the hydraulic cylinder 107 (the accelerating hydraulic cylinder) from the direction control valve 111a as hydraulic oil. When operated to switch to the deceleration side, the motor control valve mechanism 111 supplies the lubricant oil, which has been taken in from the oil supply path 106, to the hydraulic cylinder 108 (the accelerating hydraulic cylinder) from the direction control valve 111b as hydraulic oil. The pair of direction control valves 111a and 111b are configured with electromagnetic control valves, and are configured to be operated to switch according to an electrical operation instruction from a sub speed change operation part provided in the operation unit 3.

Figure 14A:
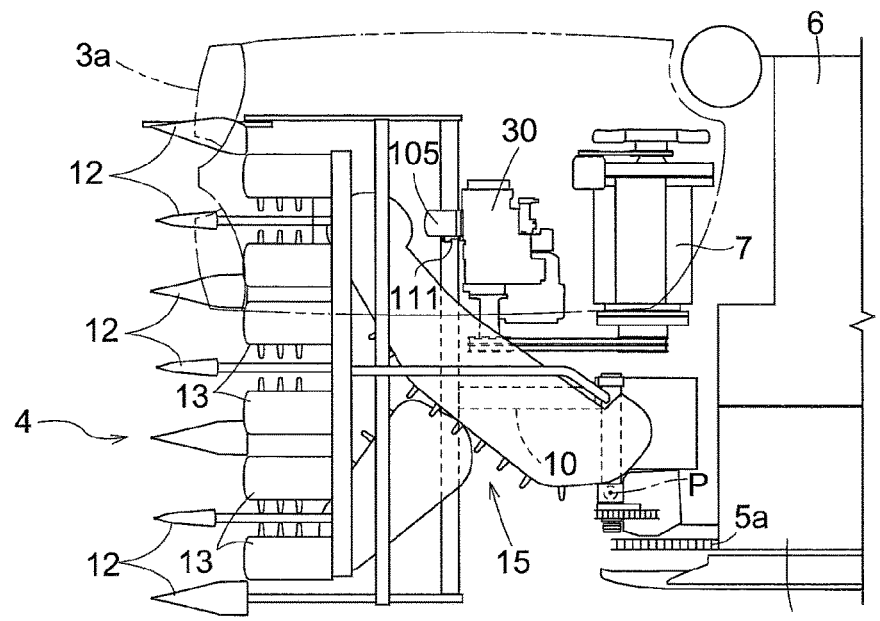
FIG. 14A is a plan view showing a reaping unit in a closed state.

As shown in FIGS. 3 to 5 and FIGS. 11 to 13, the oil filter 105 and the motor control valve mechanism 111 are disposed on a front surface portion 30f of the speed-change power transmission apparatus 30 along the top-to-bottom direction in order to make maintenance performed from the front side of the travelling machine body easy. As shown in FIG. 14A, the oil filter 105 and the motor control valve mechanism 111 are disposed out of the conveyance path of the conveying apparatus 15 such that they are unlikely to touch the reaped stalks conveyed by the conveying apparatus 15. The oil filter 105 and the motor control valve mechanism 111 are disposed on a part of the front surface portion 30f of the speed-change power transmission apparatus 30, the part being closer to a laterally outer side of the travelling machine body. Consequently, it is easy to prevent the oil filter 105 and the motor control valve mechanism 111 from coming into contact with the reaped stalks that are conveyed. The oil filter 105 is disposed above the motor control valve mechanism 111. Consequently, it is easy to prevent the motor control valve mechanism 111 from coming into contact with the reaped stalks that are conveyed. The oil filter 105 and the motor control valve mechanism 111 are disposed on a region of the front surface portion 30f, the region overlapping the partition 97.

Figure 14B:
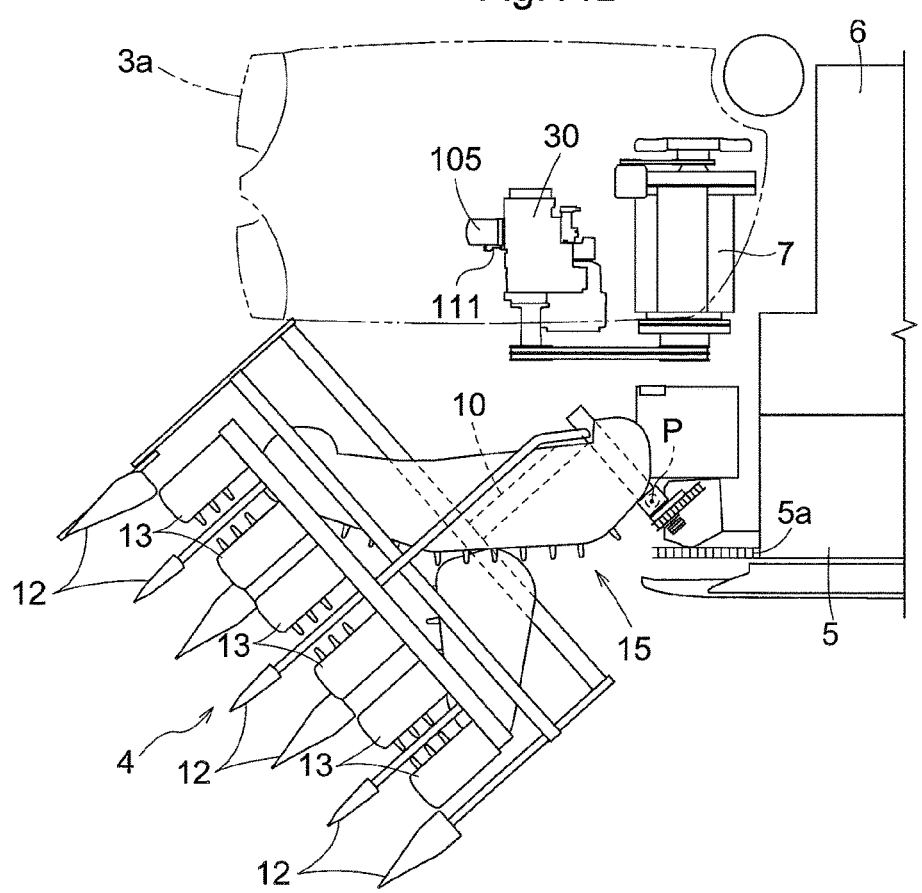
FIG. 14B is a plan view showing the reaping unit in an open state.

FIG. 14A is a plan view showing the reaping unit 4 in the closed state. FIG. 14B is a plan view showing the reaping unit 4 in the open state. As shown in FIGS. 14A and 14B, the reaping unit 4 is configured to be switchable to the closed state for work in which the reaping unit 4 is supported so as to face forward and the open state for management in which the reaping unit 4 is supported to face diagonally outward, by being operated to swing about an open/close shaft P disposed on a base portion of the reaping unit frame 10 and extend in the top-to-bottom direction of the travelling machine body. Therefore, when replacing or checking the oil filter 105 and the motor control valve mechanism 111, it is easy to perform the work by switching the reaping unit 4 to the open state to form a large work space in front of the speed-change power transmission apparatus 30.

As shown in FIGS. 19A and 19B, the oil filter 105 includes an attachment screw portion 105C provided on the base end side, and is configured to have a cassette structure such that the oil filter 105 is detachably supported by a filter support portion 140 provided on the front surface portion 30f of the power transmission case 35 by using the attachment screw portion 105C. In the filter support portion 140, an oil supply path 141 that communicates with a pre-filtering area 105A of the oil filter 105; an oil takeout path 142 that communicates with a post-filtering area 105B of the oil filter 105; an oil discharge path 143 that communicates with the oil supply path 141 and the takeout oil path 142; and a drain cylinder portion 144 are formed. A drain plug 150 is attached to the drain cylinder portion 144.

Figure 20:
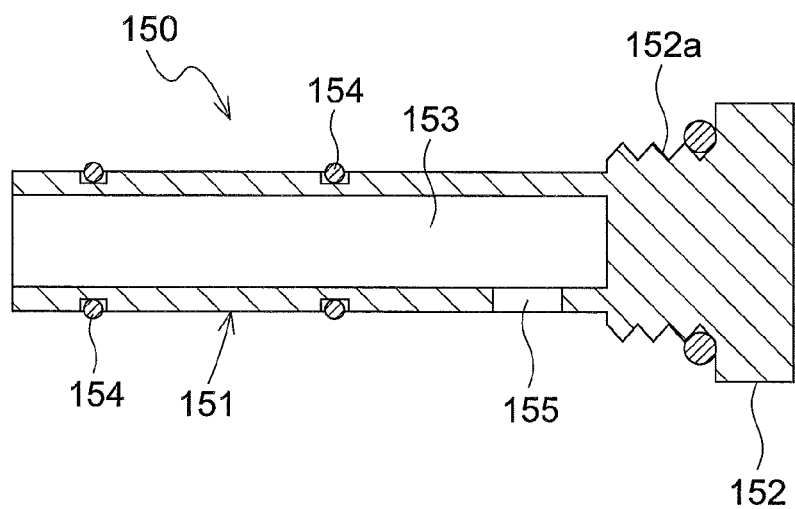
FIG. 20 is a cross-sectional view showing a drain plug.

FIG. 20 is a cross-sectional view of the drain plug 150. As shown in FIG. 20, the drain plug 150 includes: a plug main body 151; and an operation portion 152 that is coupled to the base end side of the plug main body 151. A drain flow path 153 is formed inside the plug main body 151. The drain flow path 153 is an opening provided in the tip end side of the plug main body 151. Seal rings 154 are respectively attached to two regions of the outer circumferential surface of the tip end side of the plug main body 151. A drain hole 155 is provided in the base end side of the plug main body 151. The drain hole 155 communicates with the drain flow path 153.

FIG. 19A is a cross-sectional view showing the filter support portion 140 in a normal state for actuating the oil filter 105. As shown in FIG. 19A, in the normal state for actuating the oil filter 105, the drain plug 150 is brought into the closed state in which the plug main body 151 enters deep inside the oil discharge path 143, and is fixed in the closed state by a screw portion 152a, which is provided in the operation portion 152, engaging with a threaded portion of the drain cylinder portion 144. In the closed state, the drain plug 150 closes the opening in the oil supply path 141 that faces the oil discharge path 143 at a position between the two seal rings 154 and 154 of the plug main body 151, and thus terminates the communication between the oil supply path 141 and the oil takeout path 142 via the oil discharge path 143, and the drain hole 155 also enters inside the drain cylinder portion 144 and is closed by the drain cylinder portion 144, and thus causes the oil filter 105 to perform a predetermined filtering action.

FIG. 19B is a cross-sectional view showing the filter support portion 140 during a drain operation. As shown in FIG. 19B, when the operation portion 152 is operated to rotate and release the engagement of the screw portion 152a and the drain cylinder portion 144 and consequently release the engagement of the screw portion 15a and the drain cylinder portion 144, the plug main body 151 is operated to slide outward from the drain cylinder portion 144 and the drain plug 150 is brought into the open state. When the drain plug 150 is in the open state, the plug main body 151 is out of the oil supply path 141 and the oil supply path 141 is open, and the oil supply path 141 and the oil takeout path 142 are brought into communication via the oil discharge path 143. Also, the drain hole 155 is out of the drain cylinder portion 144. Thus, the hydraulic oil inside the oil filter 105 is discharged from the oil supply path 141 and the oil takeout path 142 to the oil discharge path 143, flows from the oil discharge path 143 to the drain flow path 153, and is discharged from the drain hole 155. Therefore, it is possible to take out hydraulic oil from the oil filter 105 by performing an operation to open the drain plug 150 before removing the oil filter 105 from the filter support portion 140, and it is possible to prevent the hydraulic oil from flowing out of the oil filter 105 at the time the oil filter 105 is removed from the filter support portion 140.

With this drain structure, the oil supply path 141 and the oil takeout path 142 communicate with the drain hole 155 via the oil discharge path 143 and the drain flow path 153, and the hydraulic oil inside the oil filter 105 can be discharged from both the oil supply path 141 and the oil takeout path 142. Therefore, it is possible to swiftly discharge the hydraulic oil from the oil filter 105. Advantageously, it is possible to adjust the takeout position of the drain hole 155 with respect to the drain cylinder portion 144 by adjusting the length of the portion of the plug main body 151 extending outward from the drain cylinder portion 144. Advantageously, it is also possible to adjust the orientation of the opening in the drain hole 155 in the front-rear direction by adjusting the drain plug 150 by rotating it.

As shown in FIG. 10, one hydraulic oil path 110 out of a pair of hydraulic oil paths 110 respectively connecting the motor control valve mechanism 111 and the pair of hydraulic cylinders 107 and 108 is formed to extend from the motor control valve mechanism 111 and enter a front wall portion of the power transmission case 35, extend from the front wall portion through the partition 97, and reach the right-side hydraulic cylinder 107. The other hydraulic oil path 110 out of the pair of hydraulic oil paths 110 is formed to extend from the motor control valve mechanism 111 and enter the front wall portion of the power transmission case 35, laterally pass through the inside of the front wall portion from this region and enter the port block 43, and extend from the inside of the port block 43 and reach the left-side hydraulic cylinder 108.

As shown in FIG. 15, the speed-change control valve mechanism 81 includes a pair of electromagnetic proportional valves 115 that are connected to the servo cylinder 80 via a pair of hydraulic oil paths 114, respectively. The pair of electromagnetic proportional valves 115 are connected to the oil supply path 106 via a pilot oil path 117 having an oil filter 116.

As shown in FIG. 15, a circuit pressure adjustment mechanism 120 is provided in the oil supply path 106. The circuit pressure adjustment mechanism 120 includes: a pair of relief valves 122 and 123 that are connected to the oil supply path 106 via a relief circuit 121; and an open/close valve 124 provided in the relief circuit 121. The open/close valve 124 is configured to be operated to be switched by an electromagnet direction control valve 125.

The circuit pressure adjustment mechanism 120 is configured to, upon the open/close valve 124 being operated to switch, adjust the circuit pressure of the oil supply path 106 by switching the circuit pressure to one of two levels, namely high and low.

Specifically, when operated to close, the open/close valve 124 closes a part of the relief circuit 121, the part being located between the pair of relief valves 122 and 123, and disconnects the connection between the low pressure side relief valve 123 out of the pair of relief valves 122 and 123 and the oil supply path 106. Consequently, the relief pressure of the relief circuit 121 is set to a high relief pressure by the high pressure side relief valve 122, and the circuit pressure of the oil supply path 106 is adjusted to a high pressure.

When operated to open, the open/close valve 124 opens a part of the relief circuit 121, the part being located between the pair of relief valves 122 and 123, and connects the low pressure side relief valve 123 and the oil supply path 106. Consequently, the relief pressure of the relief circuit 121 is set to a low relief pressure by the low pressure side relief valve 123, and the circuit pressure of the oil supply path 106 is adjusted to a low pressure.

As shown in FIG. 15, the valve mechanism 82, which switches the drive mode of the speed-change power transmission apparatus 30 to the HST mode (the first mode) and the HMT mode (the second mode) and switches the output rotation direction of the speed-change power transmission apparatus 30 to the forward rotation direction and the reverse rotation direction, includes four electromagnet direction control valves 126 to 129. The electromagnet direction control valve 126 out of the four electromagnet direction control valves 126 to 129 supplies and discharges hydraulic oil to and from the hydraulic piston 71b of the switching clutch 70, and operates to switch the switching clutch 70 to the OFF state and the ON state. The electromagnet direction control valve 127 out of the four electromagnet direction control valves 126 to 129 supplies oil to the hydraulic piston 65b of the forward clutch 66, and operates to switch the forward clutch 66 to the ON state. The electromagnet direction control valve 128 out of the four electromagnet direction control valves 126 to 129 supplies oil to the hydraulic piston 67b of the reverse clutch 68, and operates to switch the reverse clutch 68 to the ON state. The electromagnet direction control valve 129 out of the four electromagnet direction control valves 126 to 129 supplies oil to the respective hydraulic pistons 65b and 67b of the forward clutch 66 and the reverse clutch 68, and operates to switch the forward clutch 66 and the reverse clutch 68 to the OFF state.

The four electromagnet direction control valves 126 to 129 are configured to be supplied with hydraulic oil from a hydraulic pump 131 via an oil supply path 130. As shown in FIG. 7, the hydraulic pump 131 is configured to be driven by the input shaft 37 and is provided in the speed-change power transmission apparatus 30.

A transmission control valve mechanism 133 is connected to the oil supply path 130 via a pressure control valve 132 that sets the system pressure of the valve mechanism 82. The transmission control valve mechanism 133 operates to switch the steering clutch, the turn brake, the slow turn clutch, and the reverse clutch provided in the travelling power transmission apparatus 31. A configuration may be adopted and implemented in which, a switching valve for lubrication is connected to the oil supply path 130, and when the forward clutch 66 and the reverse clutch 68 are switched to the OFF state, and the switching clutch 70 is switched to the ON state, i.e., when the speed-change power transmission apparatus 30 is switched to the HST mode, pressure oil is taken out of the oil supply path 130 with the switching valve, and the hydraulic oil thus taken out is supplied to the upper portion of the inside of the planetary power transmission case portion 96 as lubricant oil.

Other Embodiments (1) The embodiment above shows an example in which the partition 97 is formed integrally with the power transmission case 35. However, the present invention may be implemented with a configuration in which the partition 97 is manufactured as a member that is separate from the power transmission case 35, and then attached to the power transmission case 35.

(2) The embodiment above shows an example in which the travelling apparatuses 2 can be shifted to and driven in the first mode (the HST mode) and the second mode (the HMT mode) even in the reverse travelling. However, the present invention may be implemented with a configuration in which the reverse clutch 68 (the relay shaft 61) is not provided and, in the reverse travelling, the travelling apparatuses 2 can be shifted to and driven in only the first mode (HST mode).

(3) The embodiment above shows an example in which the continuously variable transmission unit 40 and the planetary power transmission unit 50 are arranged along the lateral direction of the travelling machine body. However, the present invention may be implemented with the continuously variable transmission unit 40 and the planetary power transmission unit 50 arranged along the front-rear direction of the travelling machine body.

(4) The embodiment above shows an example in which the continuously variable transmission unit 40 is located on the right side of the planetary power transmission unit 50 in the lateral direction of the travelling machine body. However, the present invention may be implemented with the continuously variable transmission unit 40 located on the left side of the planetary power transmission unit 50 in the lateral direction of the travelling machine body.

(5) The embodiment above shows an example in which the planetary power transmission case portion 96 is configured to be dividable into the first divisional planetary power transmission case portion 98 and the second divisional planetary power transmission case portion 99. However, the present invention may be implemented with the planetary power transmission case portion 96 configured to be dividable into three. Specifically, the present invention may be implemented with the second divisional planetary power transmission case portion 99 configured to be dividable into an upper end side second divisional planetary power transmission case portion that corresponds to the upper end portion of the first divisional planetary power transmission case portion 98 and a lower end side second divisional planetary power transmission case portion that corresponds to the lower end portion of the first divisional planetary power transmission case portion 98.

(6) The embodiment above shows an example in which the power transmission case 35 seen from above the travelling machine body has a shape in which the end 95r of the continuously variable transmission case portion 95 on the rear side of the travelling machine body is located closer to the front of the travelling machine body than the end 96r of the planetary power transmission case portion 96 on the rear side of the travelling machine body is. However, the present invention may be implemented with the power transmission case 35 having a shape in which the end 95r of the continuously variable transmission case portion 95 on the rear side of the travelling machine body is located closer to the rear of the travelling machine body than the end 96r of the planetary power transmission case portion 96 on the rear side of the travelling machine body is, or the power transmission case 35 having a shape in which the end 95r of the continuously variable transmission case portion 95 on the rear side of the travelling machine body and the end 96r of the planetary power transmission case portion 96 on the rear side of the travelling machine body are arranged in a straight line along the lateral direction of the travelling machine body.

(7) The embodiment above shows an example in which the speed-change control valve mechanism 81 and the valve mechanism 82 are attached to the power transmission case 35. However, the present invention may be implemented with the speed-change control valve mechanism 81 and the valve mechanism 82 attached to a supporting member that is separate from the power transmission case 35.

(8) The embodiment above shows an example of a configuration in which the upper end 32t of the travelling power transmission case 32 is located lower than the upper end 96t of the planetary power transmission case portion 96. However, the present invention may be implemented with a configuration in which the upper end 32t of the travelling power transmission case 32 is located higher than the upper end 96t of the planetary power transmission case portion 96, or a configuration in which the upper end 32t of the travelling power transmission case 32 and the upper end 96t of the planetary power transmission case portion 96 are located at the same height.

(9) The embodiment above shows an example of a configuration in which the engine 7 is located behind the speed-change power transmission apparatus 30. However, the present invention may be implemented with a configuration in which the engine 7 is located above or in front of the speed-change power transmission apparatus 30. Specifically, although the embodiment above shows an example in which the speed-change power transmission apparatus 30 is disposed closer to the front of the travelling machine body than the engine 7 is, the present invention may implemented with the speed-change power transmission apparatus 30 disposed closer to the rear of the travelling machine body than the engine 7 is or below the engine 7.

(10) Although the embodiment above shows an embodiment provided with the crawler-type travelling apparatuses 2, the present invention may be implemented with wheel-type travelling apparatuses.

(11) Although the embodiment above shows an example provided with the operation cabin 3a, the present invention may be implemented without the operation cabin 3a.

(12) Although the embodiment above shows an example in which the input shaft 37, the continuously variable output shaft 42a, and the relay shaft 61 are disposed to be located higher than the decelerating output shaft 38, the present invention may be implemented with the input shaft 37, the continuously variable output shaft 42a, and the relay shaft 61 disposed in front of the decelerating output shaft 38.

(13) Although the embodiment above shows an example in which the valve mechanism 82 is disposed in the planetary power transmission case portion 96, the present invention may be implemented with the valve mechanism 82 disposed in the continuously variable transmission case portion 95 or disposed on another supporting member that is separate from the speed-change power transmission apparatus 30.

(14) Although the embodiment above shows an example in which the oil filter 105 is disposed above the motor control valve mechanism 111, the present invention may be implemented with the oil filter 105 disposed below the motor control valve mechanism 111.

(15) Although the embodiment above shows an example in which the accelerating hydraulic cylinder 107 and the decelerating hydraulic cylinder 108 are separately disposed on the left and right sides of the travelling machine body with respect to the swashplate 42b, the present invention may be implemented with both the accelerating hydraulic cylinder 107 and the decelerating hydraulic cylinder 108 disposed on the left or right side of the swashplate 42b.

INDUSTRIAL APPLICABILITY

The present invention is applicable to normal-type combines as well as head-feeding type combines.

DESCRIPTION OF REFERENCE SIGNS

2: travelling apparatus
3: operation unit
7: engine
30: speed-change power transmission apparatus
30f: front surface portion
30s: lateral outer surface portion
31: travelling power transmission apparatus
32: travelling power transmission case
32t: upper end
35: power transmission case
37: input shaft
38: decelerating output shaft
40: continuously variable transmission unit
41: hydraulic pump
42: hydraulic motor
42a: motor shaft
42b: swashplate
43: port block 44: drive circuit
50: planetary power transmission unit
56: planetary output shaft
60: power transmission mechanism
61: relay shaft
75: decelerating power transmission mechanism
81: speed-change control valve mechanism
82: valve mechanism
93: inclined part
95: continuously variable transmission case portion
95A: continuously variable transmission compartment
95r: end on rear side of travelling machine body
96: planetary power transmission case portion
96A: planetary power transmission compartment
96t: upper end
96r: end on rear side of travelling machine body
97: partition
98: first divisional planetary power transmission case portion
99: second divisional planetary power transmission case portion
105: oil filter
107: accelerating hydraulic cylinder
108: decelerating hydraulic cylinder
111: motor control valve mechanism

The invention claimed is:

1. A combine that is provided with a speed-change power transmission apparatus including: a hydraulic static continuously variable transmission unit that has a hydraulic pump and a hydraulic motor, receives an input of drive force from an engine, and subjects the drive force to speed change; a planetary power transmission unit that combines the drive force from the engine and an output from the continuously variable transmission unit and outputs a combined drive force to a travelling apparatus; and a power transmission case that houses the continuously variable transmission unit and the planetary power transmission unit, wherein a continuously variable transmission case portion of the power transmission case is formed integrally with a planetary power transmission case portion of the power transmission case, the continuously variable transmission case portion housing the continuously variable transmission unit, and the planetary power transmission case portion housing the planetary power transmission unit, a partition that separates a continuously variable transmission compartment of the continuously variable transmission case portion and a planetary power transmission compartment of the planetary power transmission case portion from each other is provided within the power transmission case, the continuously variable transmission compartment housing the continuously variable transmission unit, and the planetary power transmission compartment housing the planetary power transmission unit, and a port block with which a drive circuit that connects the hydraulic pump and the hydraulic motor to each other is formed is attached to an end portion of the continuously variable transmission case portion, the end portion being opposite a side to which the planetary power transmission case portion is coupled.

2. The combine according to claim 1, wherein the planetary power transmission case portion is configured to be dividable into a first divisional planetary power transmission case portion and a second divisional planetary power transmission case portion, the first divisional planetary power transmission case portion being formed integrally with the continuously variable transmission case portion and being provided with the partition, and the second divisional planetary power transmission case portion being located opposite the continuously variable transmission case portion with respect to the first divisional planetary power transmission case portion.

3. The combine according to claim 1, wherein
the power transmission case is formed such that the continuously variable transmission case portion and the planetary power transmission case portion are arranged along a lateral direction of a travelling machine body,
the combine is provided with a travelling power transmission case that is coupled to a lateral side portion of the planetary power transmission case portion, that receives an input of a combined drive force from the planetary power transmission unit, and that transmits the combined drive force to the travelling apparatus, the lateral side portion being opposite a side to which the continuously variable transmission case portion is coupled,
the travelling power transmission case is disposed such that an upper end thereof is located lower than an upper end of the planetary power transmission case portion, and
the drive force from the engine is input to the planetary power transmission unit and the continuously variable transmission unit from a laterally outer side of the planetary power transmission case portion, the laterally outer side being opposite a side to which the continuously variable transmission case portion is coupled and being above the travelling power transmission case.

4. A combine that is provided with a speed-change power transmission apparatus including: a hydraulic static continuously variable transmission unit that has a hydraulic pump and a hydraulic motor, receives an input of drive force from an engine, and subjects the drive force to speed change; a planetary power transmission unit that combines the drive force from the engine and an output from the continuously variable transmission unit and outputs a combined drive force to a travelling apparatus; and a power transmission case that houses the continuously variable transmission unit and the planetary power transmission unit, wherein a continuously variable transmission case portion of the power transmission case is formed integrally with a planetary power transmission case portion of the power transmission case, the continuously variable transmission case portion housing the continuously variable transmission unit, and the planetary power transmission case portion housing the planetary power transmission unit, a partition that separates a continuously variable transmission compartment of the continuously variable transmission case portion and a planetary power transmission compartment of the planetary power transmission case portion from each other is provided within the power transmission case, the continuously variable transmission compartment housing the continuously variable transmission unit, and the planetary power transmission compartment housing the planetary power transmission unit, the power transmission case is formed such that the continuously variable transmission case portion and the planetary power transmission case portion are arranged along a lateral direction of a travelling machine body, and when seen from above the travelling machine body, the power transmission case has a shape in which an end of the continuously variable transmission case portion on a rear side of the travelling machine body is located closer to a front of the travelling machine body than an end of the planetary power transmission case portion on the rear side of the travelling machine body is.

5. The combine according to claim 4, wherein a speed-change control valve mechanism that performs a speed change operation with the hydraulic pump is disposed within a space that is formed by providing the power transmission case with the shape in which, when seen from above the travelling machine body, the end of the continuously variable transmission case portion on the rear side of the travelling machine body is located closer to the front of the travelling machine body than the end of the planetary power transmission case portion on the rear side of the travelling machine body is.

6. The combine according to claim 4, wherein the engine is located closer to a rear of the travelling machine body than the power transmission case is.

7. The combine according to claim 4, wherein the drive force from the engine is input to the planetary power transmission unit and the continuously variable transmission unit from a laterally outer side of the planetary power transmission case portion, the laterally outer side being opposite a side to which the continuously variable transmission case portion is coupled.

8. A combine that is provided with a speed-change power transmission apparatus including: a hydraulic static continuously variable transmission unit that has a hydraulic pump and a hydraulic motor, receives an input of drive force from an engine, and subjects the drive force to speed change; a planetary power transmission unit that combines the drive force from the engine and an output from the continuously variable transmission unit and outputs a combined drive force to a travelling apparatus; and a power transmission case that houses the continuously variable transmission unit and the planetary power transmission unit, wherein
- a continuously variable transmission case portion of the power transmission case is formed integrally with a planetary power transmission case portion of the power transmission case, the continuously variable transmission case portion housing the continuously variable transmission unit, and the planetary power transmission case portion housing the planetary power transmission unit,
- a partition that separates a continuously variable transmission compartment of the continuously variable transmission case portion and a planetary power transmission compartment of the planetary power transmission case portion from each other is provided within the power transmission case, the continuously variable transmission compartment housing the continuously variable transmission unit, and the planetary power transmission compartment housing the planetary power transmission unit,
- the power transmission case is formed such that the continuously variable transmission case portion and the planetary power transmission case portion are arranged along a lateral direction of a travelling machine body,
- an upper portion of the power transmission case is provided with an inclined part formed to have an inclined shape whose height decreases toward a rear side of the travelling machine body, and
- a valve mechanism that switches a drive mode of the speed-change power transmission apparatus to a first mode and a second mode and that switches an output rotation direction of the speed-change power transmission apparatus to a forward rotation direction and a reverse rotation direction is disposed on the inclined part, the first mode being a mode in which the continuously variable transmission unit performs a speed change action and the planetary power transmission unit does not perform a speed change action, and the second mode being a mode in which the continuously variable transmission unit and the planetary power transmission unit perform a speed change action.

9. A combine provided with:
- a speed-change power transmission apparatus that includes: an input shaft that receives an input of drive force from an engine; a hydraulic static continuously variable transmission unit that subjects drive force of the input shaft to speed change; and a planetary power transmission unit that combines the drive force of the input shaft and drive force of a continuously variable output shaft of the continuously variable transmission unit and outputs a combined drive force from a planetary output shaft; and
- a travelling power transmission apparatus that transmits the combined drive force from the planetary output shaft to a travelling apparatus,
- wherein the speed-change power transmission apparatus is provided with a decelerating output shaft that is interlocked with the planetary output shaft via a decelerating power transmission mechanism, and that decelerates and outputs the combined drive force from the planetary output shaft to the travelling power transmission apparatus,
- the speed-change power transmission apparatus is disposed closer to a front of a travelling machine body than the engine, and
- the input shaft and the continuously variable output shaft are disposed closer to the front of the travelling machine body than the decelerating output shaft.

10. The combine according to claim 9, wherein the input shaft and the continuously variable output shaft are arranged along a top-to-bottom direction of the travelling machine body.

11. A combine provided with:
- a speed-change power transmission apparatus that includes: an input shaft that receives an input of drive force from an engine; a hydraulic static continuously variable transmission unit that subjects drive force of the input shaft to speed change; and a planetary power transmission unit that combines the drive force of the input shaft and drive force of a continuously variable output shaft of the continuously variable transmission unit and outputs a combined drive force from a planetary output shaft; and
- a travelling power transmission apparatus that transmits the combined drive force from the planetary output shaft to a travelling apparatus,
- wherein the speed-change power transmission apparatus is provided with a decelerating output shaft that is interlocked with the planetary output shaft via a decelerating power transmission mechanism, and that decelerates and outputs the combined drive force from the planetary output shaft to the travelling power transmission apparatus,
- the combine is provided with a power transmission mechanism that transmits the drive force of the input shaft to the planetary power transmission unit,
- the power transmission mechanism is provided with a relay shaft, the drive force of the input shaft is transmitted to the planetary power transmission unit as a positive rotation force when the relay shaft does not intervene, and is transmitted to the planetary power transmission unit as a reverse rotation force when the relay shaft intervenes, and the relay shaft is located between the input shaft and the continuously variable output shaft in a top-to-bottom direction of the travelling machine body, and is located behind the input shaft and the continuously variable output shaft in a front-rear direction of the travelling machine body.

12. The combine according to claim 11, wherein the relay shaft is located above the decelerating output shaft.

13. The combine according to claim 11, wherein the input shaft, the continuously variable output shaft, and the relay shaft are located higher than the decelerating output shaft.

14. The combine according to claim 11,
wherein the combine is provided with a power transmission case that houses the continuously variable transmission unit and the planetary power transmission unit,
the relay shaft is provided on an upper side within a planetary power transmission case portion of the power transmission case, the planetary power transmission case portion housing the planetary power transmission unit, and
an upper portion of the planetary power transmission case portion is provided with an inclined part formed to have an inclined shape whose height decreases toward a rear side of the travelling machine body.

15. The combine according to claim 14, wherein
the combine is provided with a valve mechanism that switches a drive mode of the decelerating output shaft to a first mode and a second mode and that switches an output rotation direction of the decelerating output shaft to a forward rotation direction and a reverse rotation direction, the first mode being a mode in which the continuously variable transmission unit performs a speed change action and the planetary power transmission unit does not perform a speed change action, and the second mode being a mode in which the continuously variable transmission unit and the planetary power transmission unit perform a speed change action, and
the valve mechanism is disposed on the inclined part of the planetary power transmission case portion.

16. The combine according to claim 15, wherein
the power transmission case is formed such that the continuously variable transmission case portion and the planetary power transmission case portion are arranged along a lateral direction of the travelling machine body,
the power transmission case is provided with a partition that separates the continuously variable transmission unit and the planetary power transmission unit from each other, and
the valve mechanism is disposed on a part of the inclined part, the part being located close to the partition.

17. A combine, comprising:
an engine provided below an operation unit; and
a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus,
wherein the speed-change power transmission apparatus is disposed below the operation unit and closer to a front of a travelling machine body than the engine is,
an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction, and
the oil filter and the motor control valve mechanism are disposed on the front surface portion.

18. A combine, comprising:
an engine provided below an operation unit; and
a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus,
wherein the speed-change power transmission apparatus is disposed below the operation unit and closer to a front of a travelling machine body than the engine is,
an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction, and
the oil filter is disposed above the motor control valve mechanism.

19. A combine, comprising:
an engine provided below an operation unit; and
a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus,
wherein the speed-change power transmission apparatus is disposed below the operation unit and closer to a front of a travelling machine body than the engine is,
an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction, and
the oil filter and the motor control valve mechanism are disposed on a part of the front surface portion, the part being close to a laterally outer side of the travelling body.

20. A combine, comprising:

an engine provided below an operation unit; and a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus, wherein the speed-change power transmission apparatus is disposed below the operation unit and closer to a front of a travelling machine body than the engine is, an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction, the speed-change power transmission apparatus is provided with a power transmission case that houses the continuously variable transmission unit and the planetary power transmission unit, the power transmission case is provided with a continuously variable transmission compartment that houses the continuously variable transmission unit, a planetary power transmission compartment that houses the planetary power transmission unit, and a partition that separates the continuously variable transmission compartment and the planetary power transmission compartment from each other, and the oil filter and the motor control valve mechanism are disposed on a region of the front surface portion, the region overlapping the partition.

21. A combine comprising:

an engine provided below an operation unit; and a speed-change power transmission apparatus that has: a hydraulic static continuously variable transmission unit that receives an input of drive force from the engine and subjects the drive force to speed change; and a planetary power transmission unit that combines the drive force from the engine and drive force from the continuously variable transmission unit, and that outputs a combined drive force from the planetary power transmission unit to a travelling apparatus, wherein the speed-change power transmission apparatus is disposed below the operation unit and closer to a front of a travelling machine body than the engine is, an oil filter that acts on hydraulic oil that is supplied to the continuously variable transmission unit, and a motor control valve mechanism that performs a speed change operation with a hydraulic motor of the continuously variable transmission unit, are disposed on a front surface portion or a lateral outer surface portion of the speed-change power transmission apparatus along a top-to-bottom direction, the oil filter and the motor control valve mechanism are disposed on the front surface portion, the combine is provided with: an accelerating hydraulic cylinder that acts to press against a swashplate of the hydraulic motor such that the swashplate is operated to incline toward an acceleration side, and a decelerating hydraulic cylinder that acts to press against the swashplate such that the swashplate is operated to incline toward a deceleration side, and the accelerating hydraulic cylinder and the decelerating hydraulic cylinder are separately disposed on left and right sides of the travelling machine body with respect to the swashplate.

* * * * *